US011245939B2

(12) United States Patent
Saxena et al.

(10) Patent No.: US 11,245,939 B2
(45) Date of Patent: Feb. 8, 2022

(54) GENERATING AND TRANSMITTING METADATA FOR VIRTUAL REALITY

(71) Applicant: Samsung Electronics Co., Ltd, Suwon-si (KR)

(72) Inventors: Ankur Saxena, Dallas, TX (US); Hossein Najaf-Zadeh, Allen, TX (US); Madhukar Budagavi, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 181 days.

(21) Appl. No.: 15/001,056

(22) Filed: Jan. 19, 2016

(65) Prior Publication Data
US 2016/0381398 A1 Dec. 29, 2016

Related U.S. Application Data

(60) Provisional application No. 62/185,315, filed on Jun. 26, 2015, provisional application No. 62/263,304, filed on Dec. 4, 2015.

(51) Int. Cl.
H04N 21/235 (2011.01)
H04N 21/218 (2011.01)
(Continued)

(52) U.S. Cl.
CPC ....... *H04N 21/2353* (2013.01); *G06T 19/006* (2013.01); *H04N 21/21805* (2013.01);
(Continued)

(58) Field of Classification Search
CPC ................................................. H04N 21/2353
(Continued)

(56) References Cited

U.S. PATENT DOCUMENTS

2004/0125121 A1 7/2004 Pea et al.
2005/0286741 A1 12/2005 Watanabe et al.
(Continued)

FOREIGN PATENT DOCUMENTS

CN 102141869 A 8/2011
CN 103186922 A 7/2013
(Continued)

OTHER PUBLICATIONS

Luthra, et al.; "Call for Evidence (CfE) for HDR and WCG Video Coding"; ISO/IEC JTC1/SC29/WG11 MPEG2014/N15083, 111th MPEG meeting, Geneva, Switzerland; Feb. 2015; 46 pp.
(Continued)

*Primary Examiner* — Christopher S Kelley
*Assistant Examiner* — Asmamaw G Tarko

(57) ABSTRACT

A user equipment (UE) includes a receiver, display, and processor. The receiver is configured to receive a data stream including a plurality of frames. The data stream includes a region of interest in a key frame of the plurality of frames. The display is configured to display a portion of a frame of the plurality of frames. The processor is configured to perform an action to focus a current view of the UE to the region of interest in the key frame. Each frame of the plurality of frames includes a plurality of images stitched together to form a stitched image. The stitched image for at least one frame of the plurality of frames includes at least one high dynamic range (HDR) image and at least one standard dynamic range (SDR) image.

20 Claims, 12 Drawing Sheets

(51) Int. Cl.

| | |
|---|---|
| *H04N 21/81* | (2011.01) |
| *H04N 21/435* | (2011.01) |
| *G06T 19/00* | (2011.01) |
| *H04N 21/4728* | (2011.01) |
| *H04N 21/472* | (2011.01) |

(52) U.S. Cl.
CPC ....... *H04N 21/435* (2013.01); *H04N 21/4728* (2013.01); *H04N 21/47217* (2013.01); *H04N 21/816* (2013.01)

(58) Field of Classification Search
USPC .......................................................... 348/39
See application file for complete search history.

(56) References Cited

U.S. PATENT DOCUMENTS

| | | | |
|---|---|---|---|
| 2007/0201560 A1* | 8/2007 | Segall ................... | H04N 19/61 375/240.24 |
| 2010/0162292 A1* | 6/2010 | Potrebic ............. | H04N 5/44543 725/27 |
| 2010/0299630 A1* | 11/2010 | McCutchen ........ | G06F 16/7837 715/803 |
| 2012/0092348 A1* | 4/2012 | McCutchen .............. | G06T 3/00 345/474 |
| 2012/0095825 A1* | 4/2012 | Mei .................... | G06Q 30/0276 705/14.43 |
| 2012/0162366 A1* | 6/2012 | Ninan .................. | H04N 5/2355 348/43 |
| 2013/0083011 A1 | 4/2013 | Geisner et al. | |
| 2013/0329087 A1* | 12/2013 | Tico ....................... | H04N 5/225 348/239 |
| 2014/0050271 A1 | 2/2014 | Su et al. | |
| 2014/0085203 A1 | 3/2014 | Kobayashi | |
| 2014/0210847 A1* | 7/2014 | Knibbeler ................ | H04N 9/68 345/589 |
| 2014/0225812 A1* | 8/2014 | Hosoya ............... | G06F 3/04815 345/8 |
| 2015/0007225 A1* | 1/2015 | Strong ............... | H04N 21/4363 725/37 |
| 2015/0042890 A1* | 2/2015 | Messmer ................. | H04N 5/20 348/725 |
| 2015/0103919 A1* | 4/2015 | Hattori ................... | H04N 19/30 375/240.25 |
| 2015/0168725 A1 | 6/2015 | Kimura | |
| 2015/0173846 A1 | 6/2015 | Schneider et al. | |
| 2016/0077584 A1 | 3/2016 | Xiang et al. | |
| 2016/0165309 A1* | 6/2016 | Van Brandenburg ....................... | H04N 21/4728 725/116 |
| 2016/0307371 A1* | 10/2016 | Ayers .................... | G06T 19/006 |
| 2017/0236298 A1* | 8/2017 | Vetter ................. | H04N 5/23216 348/77 |
| 2017/0295357 A1* | 10/2017 | Yang ................. | H04M 1/72527 |

FOREIGN PATENT DOCUMENTS

| | | |
|---|---|---|
| CN | 103493490 A | 1/2014 |
| CN | 104238751 A | 12/2014 |
| EP | 0911069 | 4/1999 |
| EP | 3112985 A1 | 1/2017 |
| WO | 2015014773 | 2/2015 |

OTHER PUBLICATIONS

ITU-T Recommendation H.264, Advanced video coding for generic audiovisual services, Feb. 2014, available at https://www.itu.int/rec/T-REC-H.264-201402-I/en; 790 pp.

International Search Report dated Sep. 29, 2016 in connection with International Application No. PCT/KR2016/006573, 3 pages.

Written Opinion of the International Searching Authority dated Sep. 29, 2016 in connection with International Application No. PCT/KR2016/006573, 3 pages.

The First Office Action in connection with Chinese Application No. 201680036401.X dated Dec. 24, 2019, 23 pages.

Summons to attend oral proceedings pursuant to Rule 115(1) EPC in connection with European Application No. 16814652.0 dated May 26, 2020, 8 pages.

Communication pursuant to Article 94(3) EPC dated Jun. 12, 2019 in connection with European Patent Application No. 16 814 652.0, 5 pages.

Second Office Action in connection with Chinese Application No. 201680036401.X dated Sep. 15, 2020, 20 pages.

Minutes of the Oral Proceedings in connection with European Application No. 16814652.0 dated Oct. 23, 2020, 5 pages.

Decision to Refuse a European Patent Application in connection with European Application No. 16814652.0 dated Oct. 28, 2020, 11 pages.

Supplementary European Search Report dated Oct. 1, 2018 in connection with European Patent Application No. 16 81 4652, 12 pages.

Elmedin Selmanovic et al., "Enabling stereoscopic high dynamic range video", Signal Processing: Image Communication, vol. 29, No. 2, Feb. 2014, pp. 216-228.

Communication from a foreign patent office in a counterpart foreign application, European Patent Office, "Supplementary Partial European Search Report," Application No. EP 16814652.0, dated May 18, 2018, 12 pages.

Office Action dated Feb. 20, 2021 in connection with Chinese Patent Application No. 201680036401.X, 24 pages.

Chinese National Intellectual Property Administration, Decision to Grant dated Jul. 21, 2021 regarding Application No. 201680036401.X, 7 pages.

Zhao et al., "Interactive Web3D Publishing System", Computer Engineering, vol. 33, No. 22, Nov. 2007, 9 pages.

* cited by examiner

GENERATING AND TRANSMITTING METADATA FOR VIRTUAL REALITY

CROSS-REFERENCE TO RELATED APPLICATION(S) AND CLAIM OF PRIORITY

This application claims priority under 35 U.S.C. § 119(e) to U.S. Provisional Patent Application No. 62/185,315 filed on Jun. 26, 2015 and U.S. Provisional Patent Application No. 62/263,304 filed on Dec. 4, 2015. The above-identified provisional patent applications are hereby incorporated by reference in its entirety.

TECHNICAL FIELD

This disclosure relates generally to virtual reality. More specifically, this disclosure relates to generating and transmitting metadata for virtual reality.

BACKGROUND

Virtual reality experiences are becoming prominent. For example, 360° video is emerging as a new way of experiencing immersive video due to the ready availability of powerful handheld devices such as smartphones. 360° video enables immersive "real life", "being there" experience for consumers by capturing the 360° degree view of the world. Users can interactively change their viewpoint and dynamically view any part of the captured scene they desire. Display and navigation sensors to track head movement in real-time to determine the region of the 360° video that the user wants to view.

SUMMARY

This disclosure provides generating and transmitting metadata for virtual reality.

In a first embodiment, a user equipment (UE) includes a receiver, display, and processor. The receiver is configured to receive a data stream including a plurality of frames. The data stream includes a region of interest in a key frame of the plurality of frames. The display is configured to display a portion of a frame of the plurality of frames. The processor is configured to perform an action to focus a current view of the UE to the region of interest in the key frame. Each frame of the plurality of frames includes a plurality of images stitched together to form a stitched image. The stitched image for at least one frame of the plurality of frames includes at least one high dynamic range (HDR) image and at least one standard dynamic range (SDR) image.

In a second embodiment, a method is provided for processing a data stream. The method includes receiving the data stream including a plurality of frames. The data stream includes a region of interest in a key frame of the plurality of frames. The method also includes displaying a portion of a frame of the plurality of frames. The method also includes performing an action to focus a current view of a user equipment (UE) to the region of interest in the key frame. Each frame of the plurality of frames includes a plurality of images stitched together to form a stitched image. The stitched image for at least one frame of the plurality of frames includes at least one high dynamic range (HDR) image and at least one standard dynamic range (SDR) image.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus or method.

Figure 1:
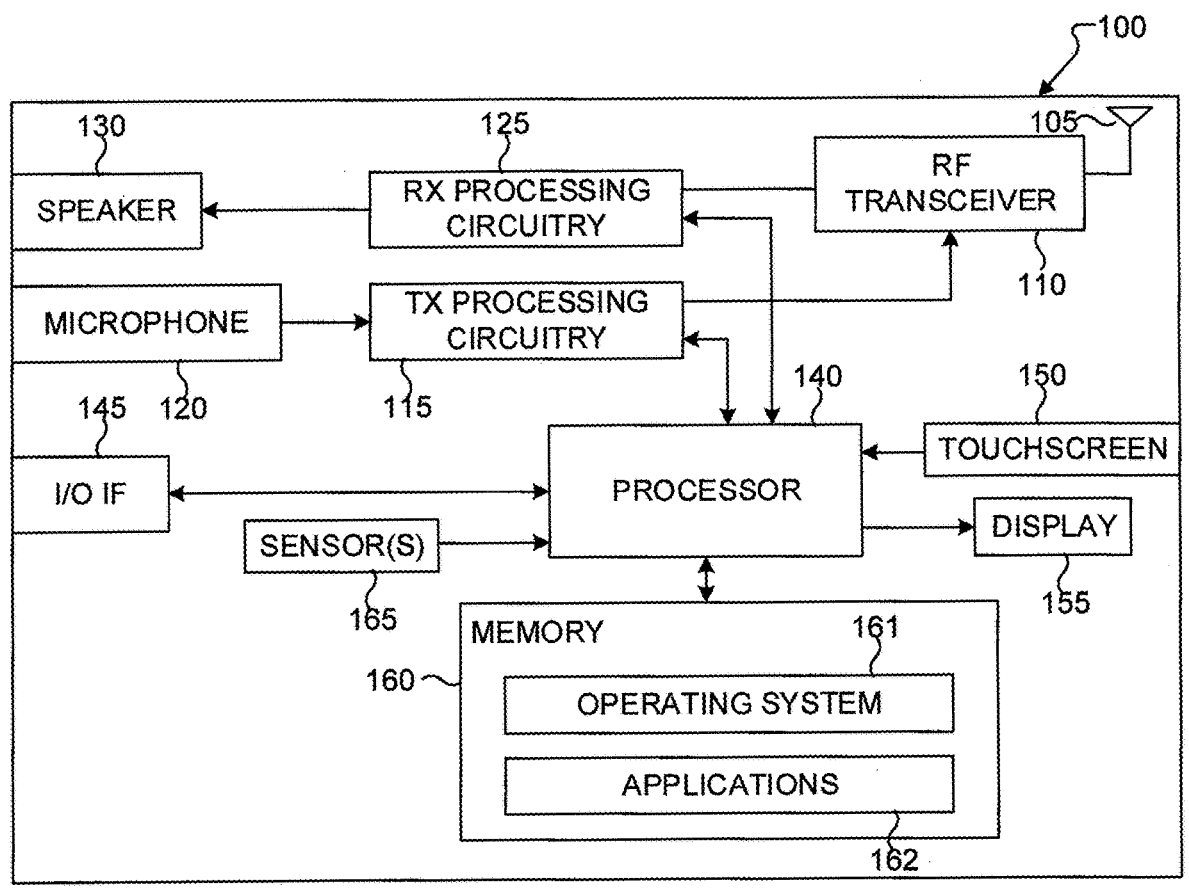
FIG. 1 illustrates an example HMD according to embodiments of the present disclosure and in which embodiments of the present disclosure may be implemented.

FIG. 1 illustrates an example HMD 100 according to embodiments of the present disclosure and in which embodiments of the present disclosure may be implemented. The embodiment of the HMD 100 illustrated in FIG. 1 is for illustration only, the HMD 100 comes in a wide variety of configurations, and FIG. 1 does not limit the scope of this disclosure to any particular implementation of a HMD.

In various embodiments, the HMD 100 may take different forms, and the present disclosure is not limited to any particular form. For example, the HMD 100 may be a mobile communication device, such as, for example, a user equipment, a mobile station, a television, a subscriber station, a wireless terminal, a smart phone, a tablet, etc., that is mountable within a headset for virtual reality (VR) and/or augmented reality (AR) applications. In other examples, the HMD 100 may include the headset and take the form of a wearable electronic device, such as, for example, glasses, goggles, a helmet, etc., for the VR and/or AR applications.

As shown in FIG. 1, the HMD 100 includes an antenna 105, a radio frequency (RF) transceiver 110, transmit (TX) processing circuitry 115, a microphone 120, and receive (RX) processing circuitry 125. The HMD 100 also includes a speaker 130, a processor 140, an input/output (I/O) interface (IF) 145, a touchscreen 150, a display 155, a memory 160, and one or more sensors 165. The memory 160 includes an operating system (OS) 161 and one or more applications 162.

The RF transceiver 110 or receiver receives, from the antenna 105, an incoming RF signal transmitted by an access point (e.g., base station, WiFi router, Bluetooth device) for a network (e.g., a WiFi, Bluetooth, cellular, 5G, LTE, LTE-A, WiMAX, or any other type of wireless network). The RF transceiver 110 or receiver down-converts the incoming RF signal to generate an intermediate frequency (IF) or baseband signal. The IF or baseband signal is sent to the RX processing circuitry 125, which generates a processed baseband signal by filtering, decoding, and/or digitizing the baseband or IF signal. The RX processing circuitry 125 transmits the processed baseband signal to the speaker 130 (such as for voice data) or to the processor 140 for further processing (such as for web browsing data).

The TX processing circuitry 115 receives analog or digital voice data from the microphone 120 or other outgoing baseband data (such as web data, e-mail, or interactive video game data) from the processor 140. The TX processing circuitry 115 encodes, multiplexes, and/or digitizes the outgoing baseband data to generate a processed baseband or IF signal. The RF transceiver 110 receives the outgoing processed baseband or IF signal from the TX processing circuitry 115 and up-converts the baseband or IF signal to an RF signal that is transmitted via the antenna 105.

The processor 140 can include one or more processors or other processing devices and execute the OS 161 stored in the memory 160 in order to control the overall operation of the HMD 100. For example, the processor 140 could control the reception of forward channel signals and the transmission of reverse channel signals by the RF transceiver 110, the RX processing circuitry 125, and the TX processing circuitry 115 in accordance with well-known principles. In some embodiments, the processor 140 includes at least one microprocessor or microcontroller. On another embodiment, the processor 140 could also be implemented as processing circuitry. The processor 140 can carry out the operations or instructions of any process disclosed herein.

The processor 140 is also capable of executing other processes and programs resident in the memory 160. The processor 140 can move data into or out of the memory 160 as required by an executing process. In some embodiments, the processor 140 is configured to execute the applications 162 based on the OS 161 or in response to signals received from eNBs or an operator. The processor 140 is also coupled to the I/O interface 145, which provides the HMD 100 with the ability to connect to other devices, such as laptop computers and handheld computers. The I/O interface 145 is the communication path between these accessories and the processor 140.

The processor 140 is also coupled to the touchscreen 150 and the display 155. The operator of the HMD 100 can use the touchscreen 150 to enter data and/or inputs into the HMD 100. The display 155 may be a liquid crystal display, light-emitting diode (LED) display, optical LED (OLED), active matrix OLED (AMOLED), or other display capable of rendering text and/or graphics, such as from web sites, videos, games, etc.

The memory 160 is coupled to the processor 140. Part of the memory 160 could include a random access memory (RAM), and another part of the memory 160 could include a Flash memory or other read-only memory (ROM).

HMD 100 further includes one or more sensor(s) 165 that can meter a physical quantity or detect an activation state of the HMD 100 and convert metered or detected information into an electrical signal. For example, sensor 165 may include one or more buttons for touch input, e.g., on the headset or the HMD 100, a camera, a gesture sensor, a gyroscope or gyro sensor, an air pressure sensor, a magnetic sensor or magnetometer, an acceleration sensor or accelerometer, a grip sensor, a proximity sensor, a color sensor 165H (e.g., a Red Green Blue (RGB) sensor), a bio-physical sensor, a temperature/humidity sensor, an illumination sensor 165K, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, etc. The sensor(s) 165 can further include a control circuit for controlling at least one of the sensors included therein. As will be discussed in greater detail below, one or more of these sensor(s) 165 may be used to control audio rendering, determine the orientation and facing direction of the user for 3D content display identification, etc. Any of these sensor(s) 165 may be located within the HMD 100, within a headset configured to hold the HMD 100, or in both the headset and HMD 100, for example, in embodiments where the HMD 100 includes a headset.

The touchscreen 150 can include a touch panel, a (digital) pen sensor, a key, or an ultrasonic input device. The touchscreen 150 can recognize, for example, a touch input in at least one scheme among a capacitive scheme, a pressure sensitive scheme, an infrared scheme, or an ultrasonic scheme. The touchscreen 150 can also include a control circuit. In the capacitive scheme, the touchscreen 150 can recognize touch or proximity.

As described in more detail below, the HMD 100 may include circuitry for and applications for providing 3D audio for a HMD. Although FIG. 1 illustrates one example of HMD 100, various changes may be made to FIG. 1. For example, various components in FIG. 1 could be combined, further subdivided, or omitted and additional components could be added according to particular needs. As a particular example, the processor 140 could be divided into multiple processors, such as one or more central processing units (CPUs) and one or more graphics processing units (GPUs). Also, while FIG. 1 illustrates the HMD 100 configured as a mobile telephone, tablet, or smartphone, the HMD 100 could be configured to operate as other types of mobile or stationary devices. In another example embodiment, when HMD 100 is a television, the HMD 100 may not include a transceiver, touchscreen, or microphone. The HMD 100 may include a receiver or decoder without a transmitter or encoder.

One or more embodiments of this disclosure provide new types of metadata, and generating the metadata for virtual reality and high dynamic range (HDR) applications. Virtual reality and HDR are emerging applications and metadata generation for these applications can support pre- and post-processing of the images or videos used in these applications. Such metadata improves picture quality, as well as user experience. An embodiment of this disclosure can assist in generating and transmitting metadata along with existing and new video codecs.

In one example, an embodiment of this disclosure operates in consumer applications such as on televisions. There is a need of efficient development of the next generation of virtual reality technologies, especially catered for HDR content. One or more embodiments of this disclosure recognize the limitations of the prior art by extracting all the relevant information useful for a virtual reality kind of application, especially for HDR content. At the encoding end, the original (uncompressed) image/video is available, which will have more information than a compressed image/video at the decoder. Thus, additional processing can be performed at the encoder to generate metadata that can be sent to the decoder as side-information. At the decoder, the metadata can be used by the virtual reality and HDR applications to improve picture quality, and enhance user experience.

Since the metadata is extracted from the original uncompressed video, the metadata is much more accurate compared to any information extracted from the decompressed video for the virtual reality application. All required VR parameters can be determined right at the encoder, and used by the VR block at the decoder, so the decoding complexity is substantially reduced.

An example of a 360° video viewer is the recently commercially launched head-mounted GEARVR device that uses the GALAXY NOTE4 as the display and navigation sensors to track head movement in real-time to determine the region of the 360° video that the user wants to view.

Figure 2:
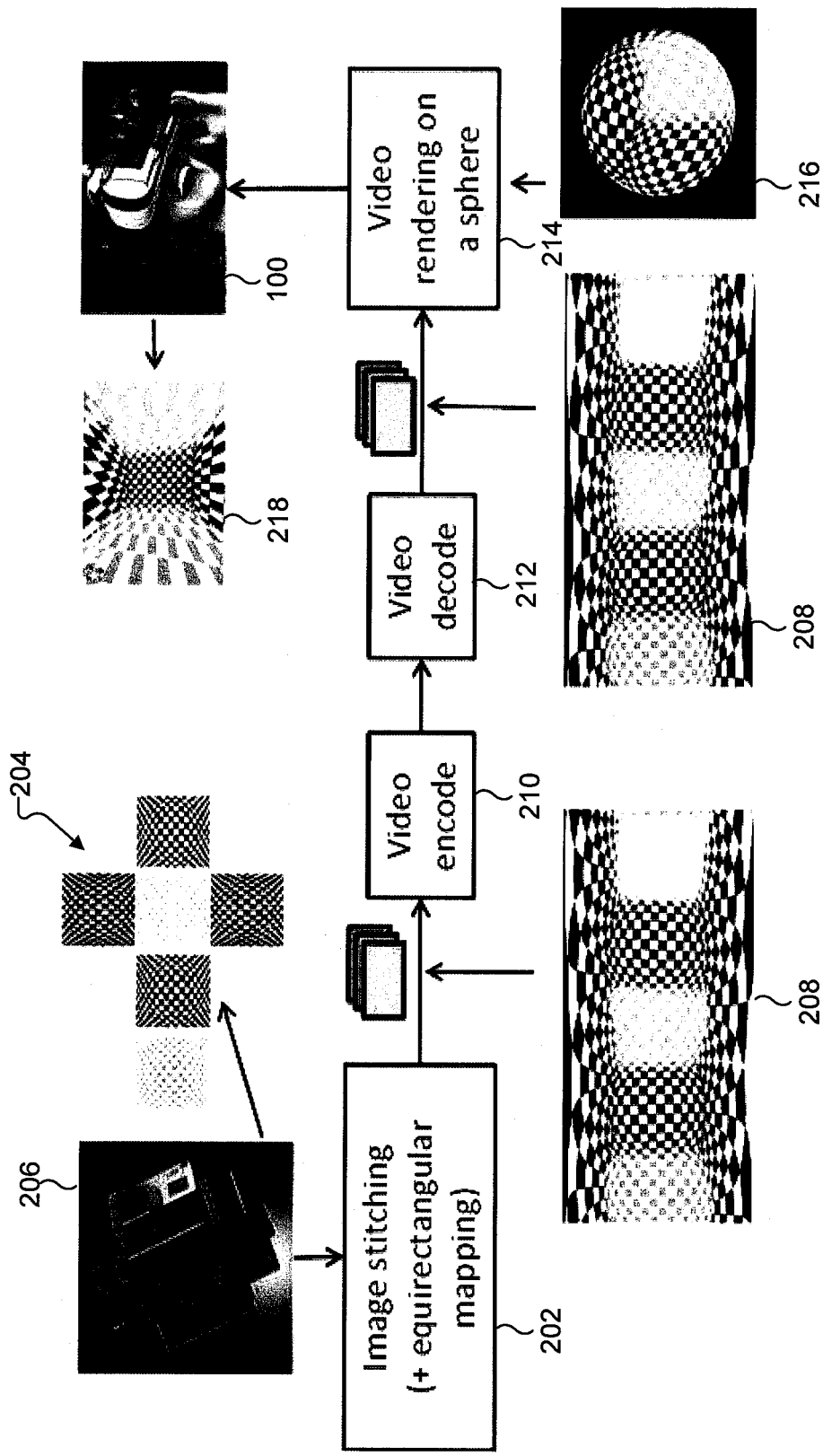
FIG. 2 illustrates an example rendering of content in an HMD according to an embodiment of this disclosure.

FIG. 2 illustrates an example rendering of content in an HMD 100 according to an embodiment of this disclosure. In FIG. 2, the process of creating a 3D space is illustrated. In different embodiments, other rendering processes can be used.

At block 202, a processor can use an input of a plurality of images 204 from a plurality of cameras 206 to perform image stitching to produce stitched image 208. As used herein, an image can also be referred to as a frame. In one example, the processor can also perform equirectangular mapping. In this example, the number of cameras and image/video feeds is seven. In other example embodiments, different numbers of cameras can be used with a different number image/video feeds. The plurality of cameras can be HDR, standard dynamic range (SDR), or a combination.

At block 210, a processor can encode the stitched image 208. At block 212, a processor of HMD 100 can decode the stitched image 208. At block 214, the processor of HMD 100 can map the stitched image 208 into a 360° sphere 216. At block 218, the processor of HMD 100 can output the 360° sphere 216 into a display of HMD 100 in 360° video or image content to show a view 218 of the HMD 100.

HDR is becoming prevalent for new kind of content. Cameras which can capture low to high intensities such as from 0.01 to around 10,000 nits have been developed. Studios are creating HDR content, and various standardization bodies are working on creating standards for HDR, such as MPEG-HDR.

Figure 3:
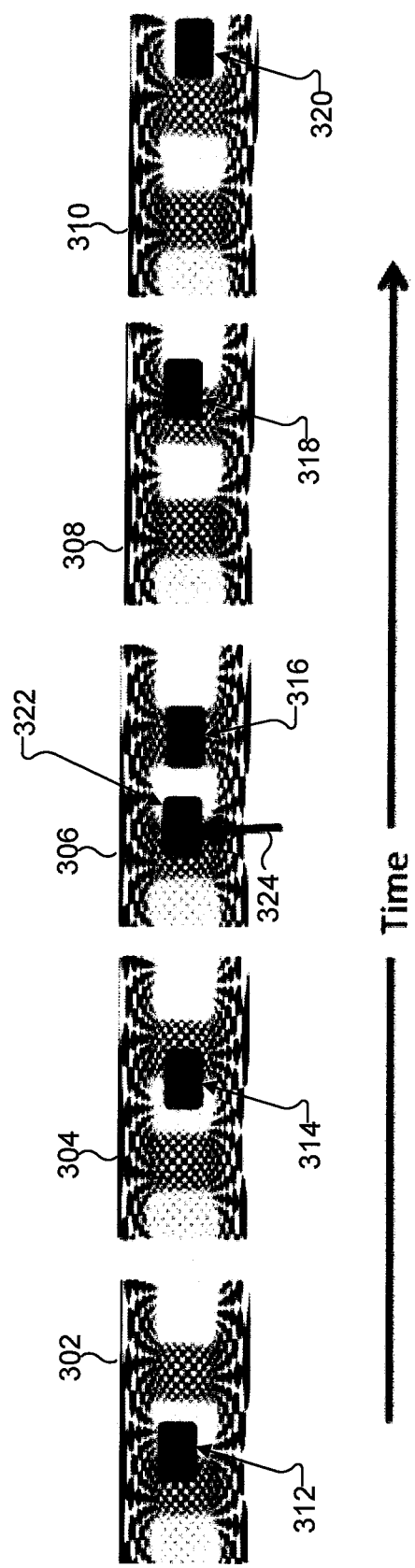
FIG. 3 illustrates an example rendering of content in an HMD with regions of interest in frames according to an embodiment of this disclosure.

FIG. 3 illustrates an example rendering of content in an HMD 100 with regions of interest in frames 302-310 according to an embodiment of this disclosure. In FIG. 3, current viewpoints 312-320 can be a region of frames 302-310 that a user is currently focused. One or more of frames 302-310 can be a key frame. A key frame can include a region of interest 322 that is an area of frame 306 where a user should be focusing. In different embodiments, other focus areas can be regions of interest. The region of interest 322 can be indicated by metadata. Each of the frames 302-310 is displayed over time.

In one example embodiment, metadata can include information related to current viewpoints 312-320. Current viewpoints 312-320 can be where a user is interested in viewing the video (e.g., there might be some locations based on objects where a user is likely to focus). Different regions of interest in a 360° space can include different objects.

In another example, metadata can include information related to region of interest 322. VR allows for full flexibility for the end-viewer to see in any direction. In an example of a movie being shown in VR, the director of the movie may want to control the story to ensure the viewer does not miss region of interest 322 in frame 306, thereby maintaining the creative intent. For example, region of interest 322 might be missed by the user has moved to a different current viewpoint 316 in the 360° world. Because frame 306 includes region of interest 322, frame 306 can be referred to as a key frame.

In one example embodiment, to indicate the region of interest to a VR viewer, the region of interest could be highlighted or indicated by a pointer 324 as shown in frame 306. The pointer 324 could be projected on frame 306 to indicate to the user to move towards the region of interest. In different embodiments, other user interface (UI) modalities are possible. Pointer 324 can be shown some time before the key frame so that the viewer has a chance to select it, and move to that location in the 360° world.

Metadata (phi, theta, zoom) can be extracted on a key frame basis for regions of interest, and sent some time k before that particular key frame allowing the VR scene to move to that particular viewpoint in k seconds using the metadata for the region of interest.

TABLE 1

Metadata details for creative intent
and region of interest functionality

```
view_point_user( ) {
    key_frame_numList
    size_kf_numList
    Offset k
    for (i=key_frame_numList(0); i <
    key_frame_numList(size_kf_numList);i++) {
        theta
        psi
        zoom
    }
}
```

In Table 1:
key_frame_numList denotes the list of key frames.
size_kf_numList denotes the size of the key frame list.
Offset k denotes the time offset k before a key frame according to which the viewer can reach the desired location by the key frame.
theta specifies the theta angle of view for the centre of gravity of VR scene in a horizontal direction. For example, on a spherical display, this would be from 0° to 360° and can be considered as the longitude on a sphere (globe).
psi specifies the psi angle of view for the centre of gravity for VR scene in a vertical direction. For example, on a spherical display, this would be from 0° to 180° (+/− 90°) and can be considered as the latitude on a sphere (globe).
zoom specifies the radius (distance from the virtual eye) for the centre of gravity for VR scene. This will be based on the virtual depth (distance) of the centre of gravity of the region, and a zoom in/out operation can be performed if required if the region is significantly smaller/larger at the display.

The metadata for regions of interest can be used for advertisements. One or more embodiments of this disclosure recognizes and takes into account that in VR, there is currently no way to focus the interest of the user on the advertised object. The region of interest metadata can be used to focus user attention on the advertised object by creating a pointer or other UI.

In another example embodiment, a user that captures user-generated content may desire to focus the interest of the end-viewer on a region of interest. An embodiment of this disclosure recognizes and takes into account that no such mechanism currently exists in VR formats to allow for this control by the director (for creative intent) or for the user generated content. For example, social media video sites such as TWITCH and YOUTUBE allow for sharing of personalized experiences that might include regions of interest.

Figure 4:
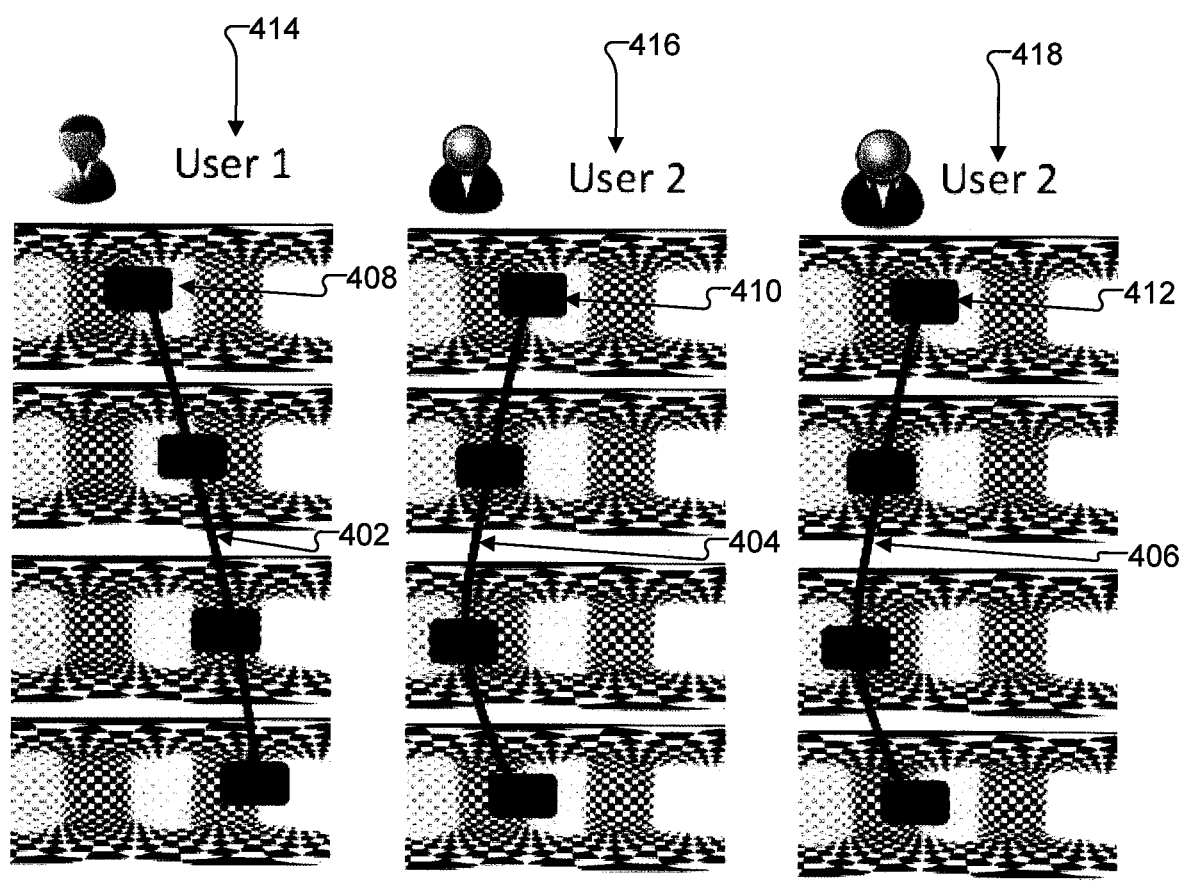
FIG. 4 illustrates an example rendering of content in an HMD with different trajectories as regions of interest according to an embodiment of this disclosure.

FIG. 4 illustrates an example rendering of content in an HMD 100 with different trajectories 402-406 as regions of interest according to an embodiment of this disclosure. In FIG. 4, a region of interest can be trajectories 402-406 of current viewpoints 408-412 of users 414-418. Trajectory 402 can be the movement of current viewpoint 408 through frames and time. Trajectory 404 can be the movement of current viewpoint 410 through frames and time. Trajectory 406 can be the movement of current viewpoint 412 through frames and time. In different embodiments, other types of regions of interest can be used.

In a VR movie, it is possible that different users 414-418 have different trajectories 402-406 for watching. One or more embodiments of this disclosure provide a mechanism to share trajectories 402-406 to other viewers (friends, family etc.) in order to share personalized experience in VR.

Sharing of personalized VR experiences is also applicable to live or recorded sports events where different viewers (with different team loyalties) can view the game from different perspective. For example, different viewers can follow their favorite sports person in the game. Automatic techniques can also be used to create different view trajectories based on tracking of sports person in the game An end-user might be interested in only specific kind of regions. For example, the end-user may be interested in regions where there is high activity across time, a high texture (details), where the (average) luminance in that region is above a threshold, etc. Such interesting regions can be application specific, and can be found using segmentation algorithms Also, based on the metadata, the frames or portions of the frames with regions of interest of the video can be compressed/processed with a higher fidelity. The frames or portions of the frames without regions of interest can be compressed/processed with lower fidelity. At the decoder, the metadata can be used to identify proper de-compression. Further, the metadata can be used to perform post-processing of the regions of interest.

Figure 5:
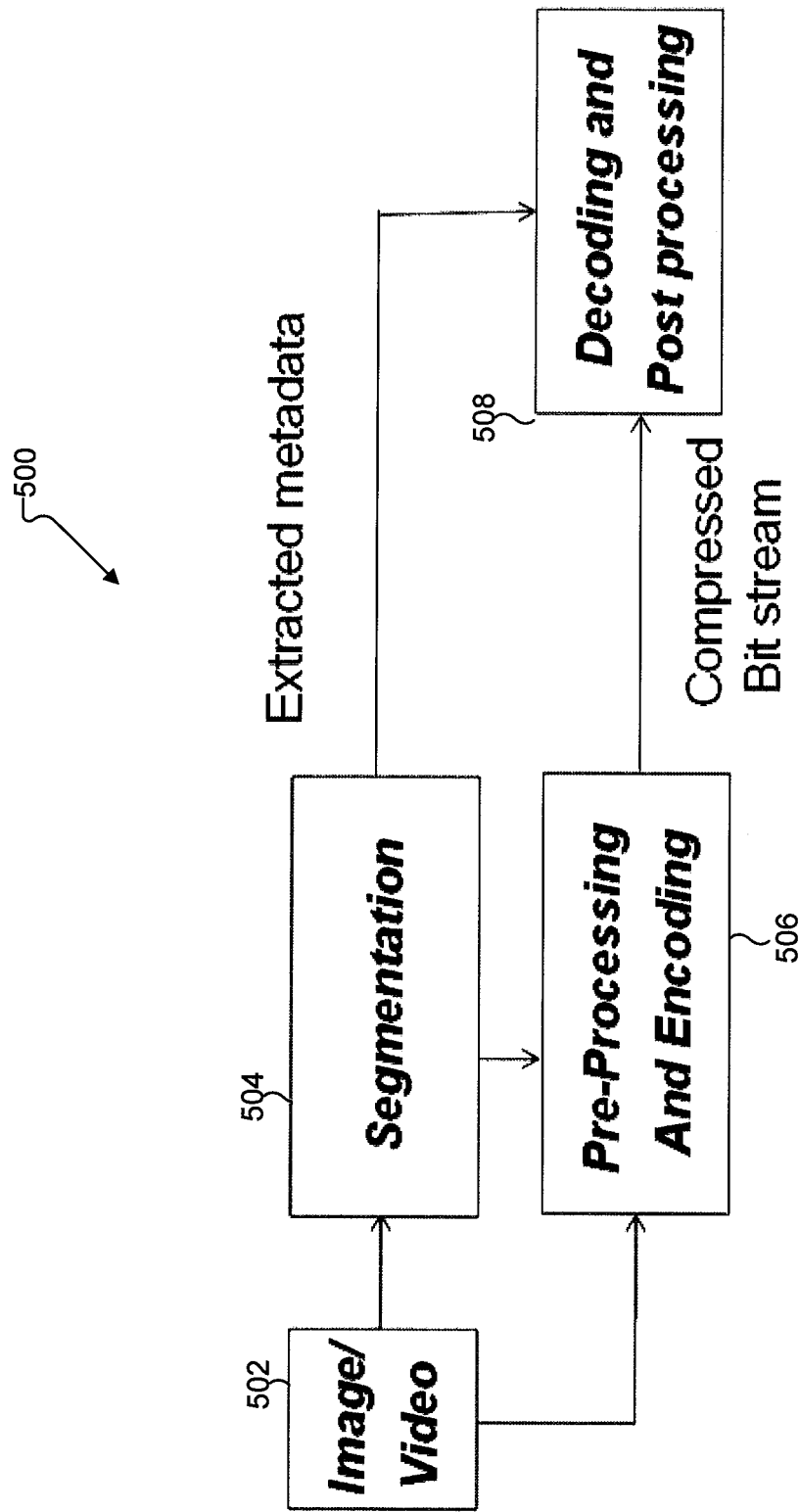
FIG. 5 illustrates process for processing with regions of interest according to this disclosure.

FIG. 5 illustrates process 500 for processing with regions of interest according to this disclosure. The embodiment shown in FIG. 5 is for illustration only. Other embodiments could be used without departing from the scope of the present disclosure. A processor, such as processor 140 as shown in FIG. 1, can perform different steps of process 500. In this example, metadata is sent for multiple regions of interest in a scene or frame.

At block 502, a processor receives images or video. At block 504, the processor can perform segmentation to identify regions of interest in images or video. The processor can create metadata based on the regions of interest. At block 506, the processor can perform pre-processing and encoding of the segmented images or video. At block 508, a processor can extract the metadata and perform decoding and post processing based on the metadata.

In one example embodiment, the metadata can include a number of regions of interest in an image or frame. The metadata can also include whether the image or frame is regular (rectangle) or irregular (non-rectangle).

In another example, the metadata can also include, for each region of interest, starting and end positions of pixels as follows:

If region are regular, the metadata can include pixel locations of top-left, bottom-left, top-right, and bottom-right pixels.

If region is irregular, first pixel location (x,y) of boundary; and a flag endRegion whether this is the end pixel for the region. This will be followed by a second pixel location (x,y) of boundary and flag endRegion; followed by the number of pixels required to define the boundary. For the final pixel, the endRegion flag would be 1. As an example, for a triangle, for the third pixel on the boundary, the endRegion would be 1

Figure 6:
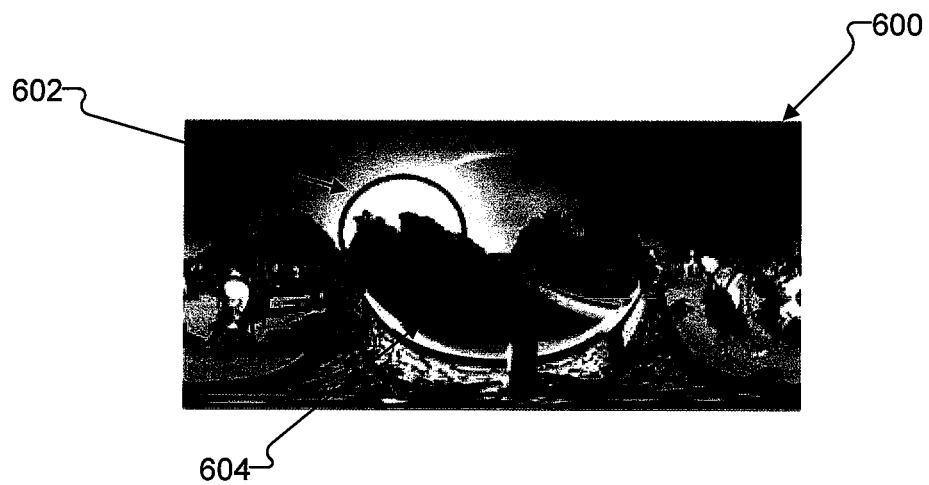
FIG. 6 illustrates an example frame of 360° video according to an embodiment of this disclosure.

One or more embodiments of this disclosure provide view dependent tone mapping (parameters) metadata. The content (images and frames) captured by 360° cameras can include a wide dynamic range. The dynamic range can change significantly between multiple cameras exposures. For example, in outdoor scenes, cameras pointing at the sun have too much peak brightness while cameras pointing away from the sun have less peak brightness FIG. 6 illustrates an example frame 600 of 360° video according to an embodiment of this disclosure. In FIG. 6, frame 600 includes a bright region 602 and a dark region 604. One or more embodiments of this disclosure recognizes and takes into account that normalizing the images from multiple cameras, and stitching them into a single 360° SDR image leads to un-natural dark regions in the image. In contrast, a human eye is able to adapt and perceive the details in the dark regions. In this example, a view or region of interest dependent adaptive dynamic range expansion/compression (tone mapping/inverse tone mapping) can be performed by one or more processors as follows:

Capture content with high nits (e.g., 4000 nits).

Include spatial varying dynamic range metadata e.g., tone mapping parameters for different regions such as max, average, min luminance's in that region.

Include (static) metadata for region segmentation (e.g., fixed per camera configuration).

Depending on where the user is looking at in the 360° world, selectively apply metadata and color volume transform to mimic behavior of human eye.

One or more embodiments of this disclosure provide solutions when receiving content of images and video obtained by a mix of HDR and SDR cameras. HDR cameras can be expensive and 360° video requires multiple cameras to capture 360° world. A combination of HDR and SDR cameras can be used to reduce cost.

Figure 7:
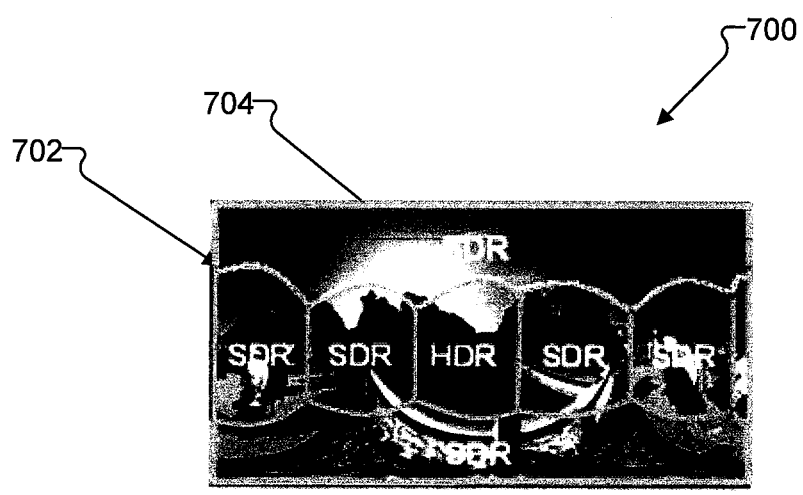
FIG. 7 illustrates an example of a 360° image from mix of HDR and SDR cameras according to an embodiment of this disclosure.

FIG. 7 illustrates an example of a 360° image 700 from mix of HDR and SDR cameras according to an embodiment of this disclosure. In FIG. 7, image 700 includes SDR regions 702 and an HDR region 704. Image 700 includes different SDR and HDR regions. One or more embodiments of this disclosure provide a VR format that supports HDR and HDR plus SDR functionality in such systems. An example embodiment of this disclosure can include the original picture, stitching map of the images, and the tone mapping parameters (or inverse tone mapping if content is SDR) for each of the various regions. An example embodiment of this disclosure provides view-dependent tone mapping parameters. In an embodiment, these parameters could be part of a new annex in a H.264/AVC or HEVC protocol.

TABLE 2

Metadata details for an HDR plus SDR camera, and associated tone mapping/inverse tone mapping in VR scenario.

```
typeContent( ) {
    num_regions
    for (i=0; i < num_regions; i++ ){
        region_regular_flag
        if (region_regular_flag ==1){
            pixel_top_left
            pixel_top_right
            pixel_bottom_left
            pixel_bottom_right
        }
        else{
            first_pixel_location
            end_region_flag
            while (!end_region_flag){
                next_boundary_pixel_location
            }
        }
        isHDRFlag
        if (isHDRFlag ==1){
            tone_mapping_params
        }
        else{
            inverse_tone_mapping_params
        }
    }
}
```

In Table 2:

num_regions specifies the number of regions of interest in picture.

region_regular_flag specifies whether the region is regular (rectangular) if 1. If 0, it specifies that the region is irregular.

pixel_top_left specifies the location of the top-left pixel of the rectangular region.

pixel_top_right specifies the location of the top-right pixel of the rectangular region.

pixel_bottom_left specifies the location of the bottom-left pixel of the rectangular region.

pixel_bottom_right specifies the location of the bottom-right pixel of the rectangular region.

first_pixel_location specifies the location of the first pixel in an irregular region.

end_region_flag specifies whether the current pixel in an irregular region is the last pixel on the boundary. If 0, it means that there are more boundary pixels in those irregular regions. If 1, it means that the current pixel is the last boundary pixel in the region.

next_boundary_pixel_location specifies the location of the next boundary pixel in an irregular region.

isHDRFlag specifies whether the content is HDR if 1 or SDR if 0.

tone_mapping_params specify the default type of tone mapping to be performed if isHDRFlag is 1, i.e., the content is HDR. The parameters can be used in tone mapping if the display is SDR, and can act as informative default tone mapping parameters.

inverse_tone_mapping_params specify the default type of inverse tone mapping to be performed if isHDRFlag is 0, i.e., the content is SDR. The parameters can be used in inverse tone mapping if the display is HDR, and can act as informative default tone mapping parameters.

In one embodiment, even if all the cameras in a 360° video scenario are HDR, the content can be still saved in HDR plus SDR format (by appropriate tone mapping) due to considerations such as bit-rates, bandwidth etc. In addition, the regions around the field of view (key regions) can be saved in HDR format since those are important according the director. Other regions far away from the key regions can be saved in SDR format.

Figure 8:
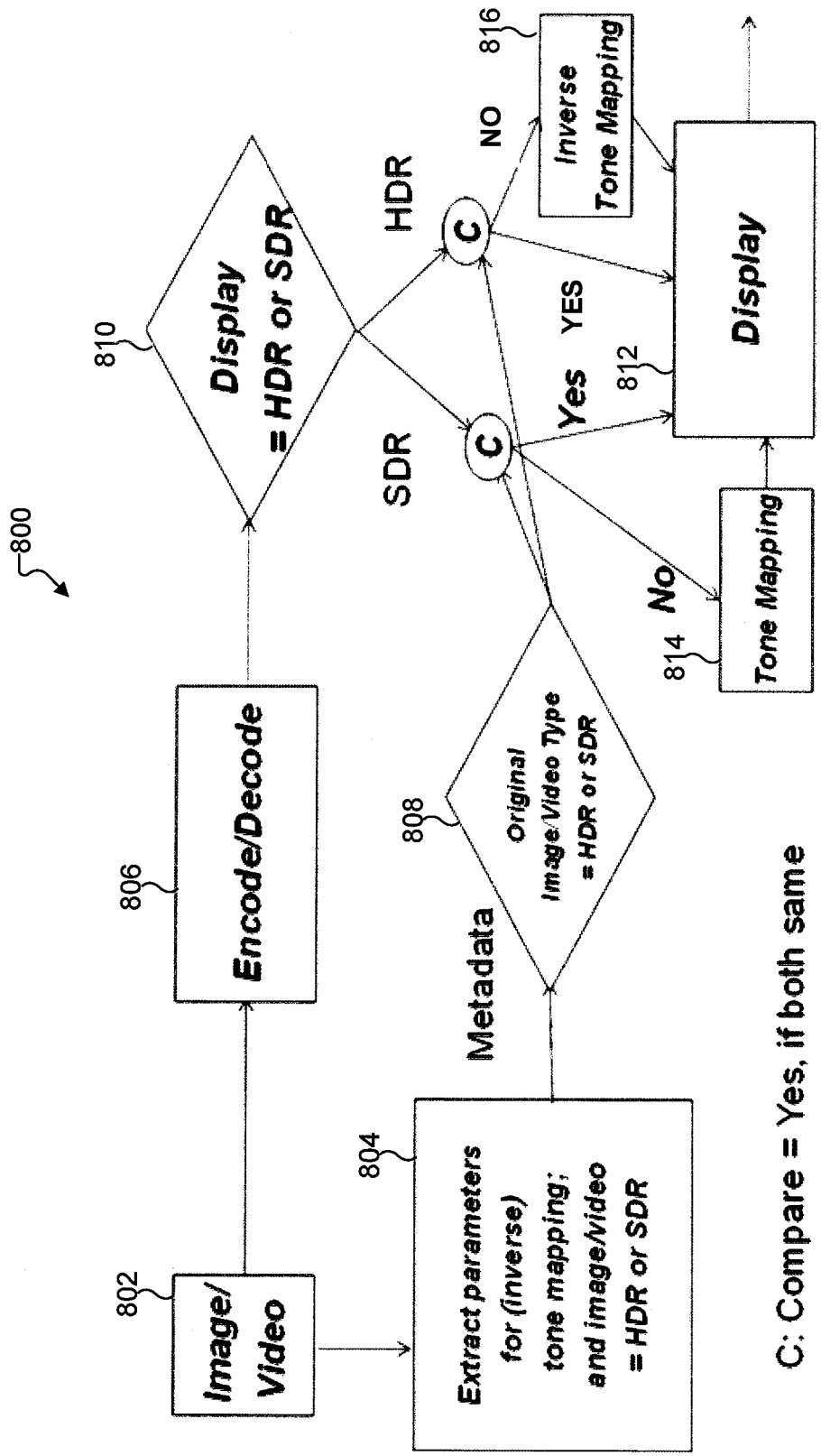
FIG. 8 illustrates process for specifying HDR or SDR content according to this disclosure.

FIG. 8 illustrates process 800 for specifying HDR or SDR content according to this disclosure. The embodiment shown in FIG. 8 is for illustration only. Other embodiments could be used without departing from the scope of the present disclosure. A processor, such as processor 140 as shown in FIG. 1, can perform different steps of process 800.

One or more embodiments of this disclosure recognize and take into account that, for an immersive setting with a person viewing video in a room, and the screens along the walls of the room, the video can be delivered in HDR format. Alternatively, on a wearable device, the video can be rendered in SDR format. Depending on the application, metadata can be sent for HDR or SDR content to the decoder for appropriate processing such as tone mapping from HDR to SDR, if content was delivered in HDR, and required to be seen on a wearable device, or inverse tone mapping for immersive setting if the content was originally delivered in SDR. This metadata for an immersive or wearable device can also be encapsulated in SEI messages.

At block 802, an image or video region is provided. At block 804, a processor can extract parameters for region tone mapping (or inverse tone mapping). At block 806, the image or video region is encoded, transmitted to a decoder, and decoded.

At block 808, a processor determines whether the original image or video region was HDR or SDR, while at block 810 the processor determines whether the display is HDR or SDR compatible. If both the region and the display are SDR or HDR, then at block 812 the processor controls a display to display the image or video. If the region is HDR and the display is SDR, then at block 814, the processor performs tone mapping, and then at block 812 controls the display to display the image or video. If the display is HDR and the region is SDR, then at block 816, the processor performs inverse tone mapping, and then at block 812 controls the display to display the image or video.

Within a given scene, some regions can be HDR while some can be SDR. For example, in a sports application, where there is activity (e.g., players or ball moving), regions of activity could be HDR, while the (possibly static) background can be in SDR format.

In one example embodiment, the metadata can include the number of different regions in picture and whether the regions are regular (rectangle) or irregular (non-rectangle). For each region, the metadata can specify starting and end positions of pixels, whether each region is HDR or SDR, and whether a tone mapping or inverse tone mapping function to be used. If region are regular, the metadata can include pixel locations of top-left, bottom-left, top-right, and bottom-right pixels. If a region is irregular, the metadata can include a first pixel location (x,y) of a boundary, and a flag endRegion to indicate the end pixel for the region. This will be followed by a second pixel and flag endRegion; followed by the number of pixels required to define the boundary. For the final pixel, the endRegion flag would be 1. As an example, for a triangle, for the third pixel on the boundary, the endRegion would be 1. The metadata can specify whether the region is HDR or SDR via an isHDR flag. If the isHDR flag is 1, i.e., the region is HDR, then the metadata can specify the tone mapping function to convert to SDR. Otherwise, the metadata can specify the inverse tone mapping function to convert to HDR if required at decoder.

In an embodiment of this disclosure, metadata includes peak luminance values for different regions (camera views) in a VR/360° scene.

In an example where all cameras are HDR, each camera would be mapped on a rectangular plane. The display will show a part of this whole scene at a particular time. To obtain a specific energy rating, one or more embodiments of this disclosure provide an average power dissipated at a certain time (or at a certain instant in time) less than a certain threshold.

In an example embodiment, an assumption can be that in the VR plus HDR applications, at all times, the average luminance need to be below a certain value. This can be easily generalized to the case of multiple values which would be needed when the VR plus HDR is switching on, switching off, being used etc. In this example embodiment, assuming an average luminance is A nits (for example 500 nits) and a peak luminance for each of the seven regions from seven cameras is $P_k$ nits (k=1 . . . 7) (assuming seven cameras), where $P_k$ can be, for example, 2000 nits. If a particular region from one camera were not bright (e.g., all pixels less than 200 nits in that region), that particular region would be fine to display as-is if only that region is being shown. Alternatively, if the peak luminance for any of the seven regions is higher than A nits, the average luminance of that particular region may also be higher than A nits.

In an example where only one region is being shown on the display, an input luminance for each pixel in region can be defined as where i=1 . . . N, and where N denotes the total number of pixels in that region. The average luminance of this region denoted as B nits is given by:

$$\text{average Luminance} = \sum_{i=0}^{N} u_i = B,$$

where the sum is over pixels in that region only.

In an example, if a display is to meet a specific energy rating, the average luminance may be desired to be less than A nits. The luminance in the scene would be needed to be decreased to A nits as follows by using a function $f$ as follows:

$$\text{lum}_{out} = f(\text{lum}_{in}),$$

such that the final average luminance, denoted as C:

$$\sum_{i=0}^{N} u_i f(u_i) = C \leq A.$$

In another example embodiment the display shows two regions, or parts of two regions simultaneously. In this example, $P_1$ and $P_2$ can be the peak luminance of the two regions. If each of $P_1$ and $P_2$ are less than average A nits, i.e., max $(P_1,P_2)<A$, then no function $f$ needs to be applied. If at least one of $P_1$ or $P_2$ is higher than A nits, then the function $f$ can be calculated with for all the relevant pixels in two regions. This information of various peak luminance P and region maps can be transmitted to the decoder as metadata. Such a metadata can be static (once per sequence) or dynamic (per scene/picture or GOP etc.).

Figure 9A:
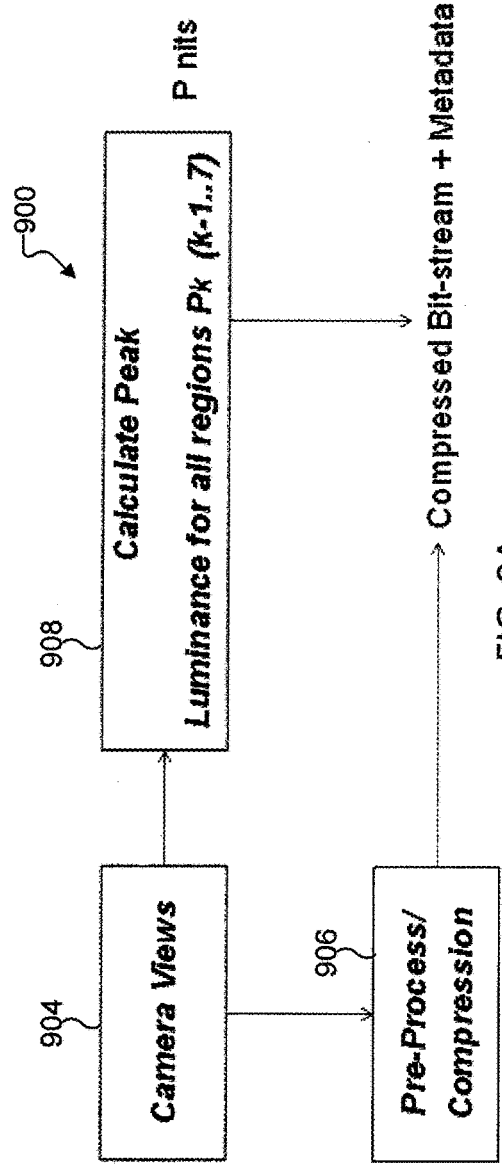
FIGS. 9A and 9B illustrate processes for generating metadata at an encoder and using the metadata at a decoder according to an embodiment of this disclosure.
Figure 9B:
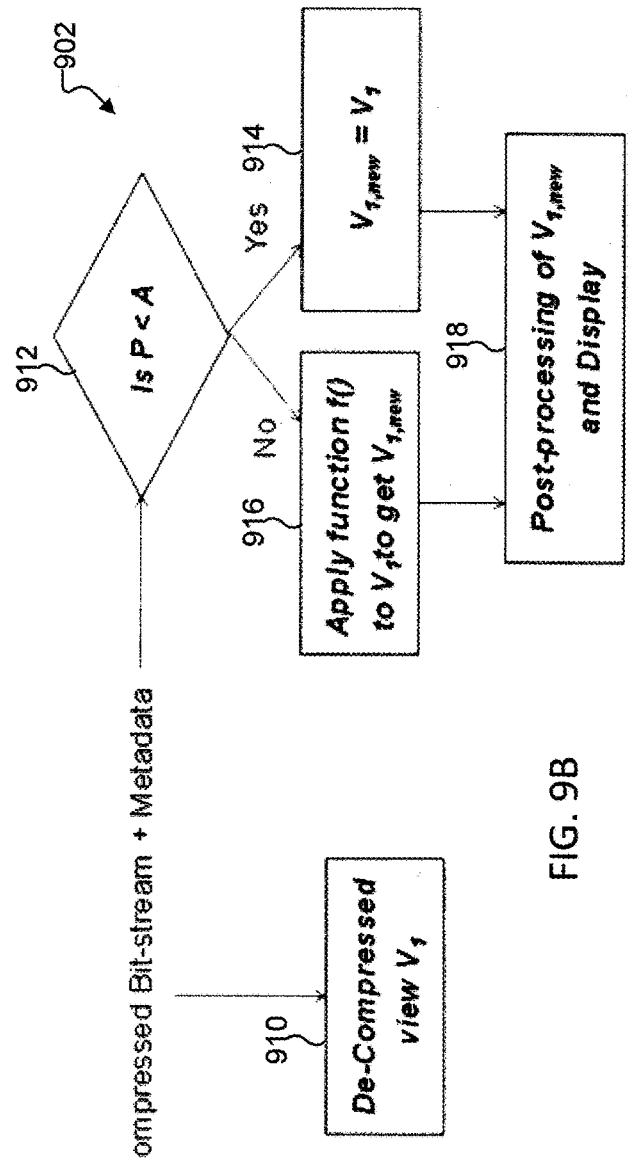

FIGS. 9A and 9B illustrate processes 900 and 902 for generating metadata at an encoder and using the metadata at a decoder according to and embodiment of this disclosure. The embodiments shown in FIGS. 9A and 9B are for illustration only. Other embodiments could be used without departing from the scope of the present disclosure. A processor, such as processor 140 as shown in FIG. 1, can perform different steps of processes 900 and 902.

At block 904, camera views can be provided as frames or scenes. At block 906, an encoder can perform pre-processing and/or compression. The compressed bit stream can be transmitted to a decoder. At block 908, the encoder can calculate peak luminance for all regions $P_k$ nits as metadata. The metadata can be transmitted to a decoder. At block 910 the decoder decompress the camera views $V_1$. At block 912, the decoder can determine if max $(P_k)<A$. If yes, then at block 914, the decoder can set $V_{1,new}=V_1$, where V is a view, such as a frame, image, or scene. If no, at block 916, the decoder applies function $f(\ )$ to $V_1$ to get $V_{1,new}$. After blocks 914 and 916, the decoder performs post-processing of $V_{1,new}$ and controls a display to display $V_{1,new}$.

Also, if amongst the two regions, one region is SDR while other is HDR, the process could be applied only on the HDR region as the peak luminance of the SDR region would already be less than A nits. In this example, where peak luminance of two regions differs significantly, an additional step of smoothing the boundaries can also be applied.

The metadata can include the number of different regions in picture and whether the regions are regular (rectangle) or irregular (non-rectangle). For each region, the metadata can specify starting and end positions of pixels, whether each region is HDR or SDR, and whether a tone mapping or inverse tone mapping function to be used. If region are regular, the metadata can include pixel locations of top-left, bottom-left, top-right, and bottom-right pixels. If a region is irregular, the metadata can include a first pixel location (x,y) of a boundary, and a flag endRegion to indicate the end pixel for the region. This will be followed by a second pixel and flag endRegion; followed by the number of pixels required to define the boundary. For the final pixel, the endRegion flag would be 1. As an example, for a triangle, for the third pixel on the boundary, the endRegion would be 1. The metadata could specify whether the region is HDR or SDR via an isHDR flag. The metadata can specify peak luminance of the region k denoted as $P_k$.

Figure 10A:
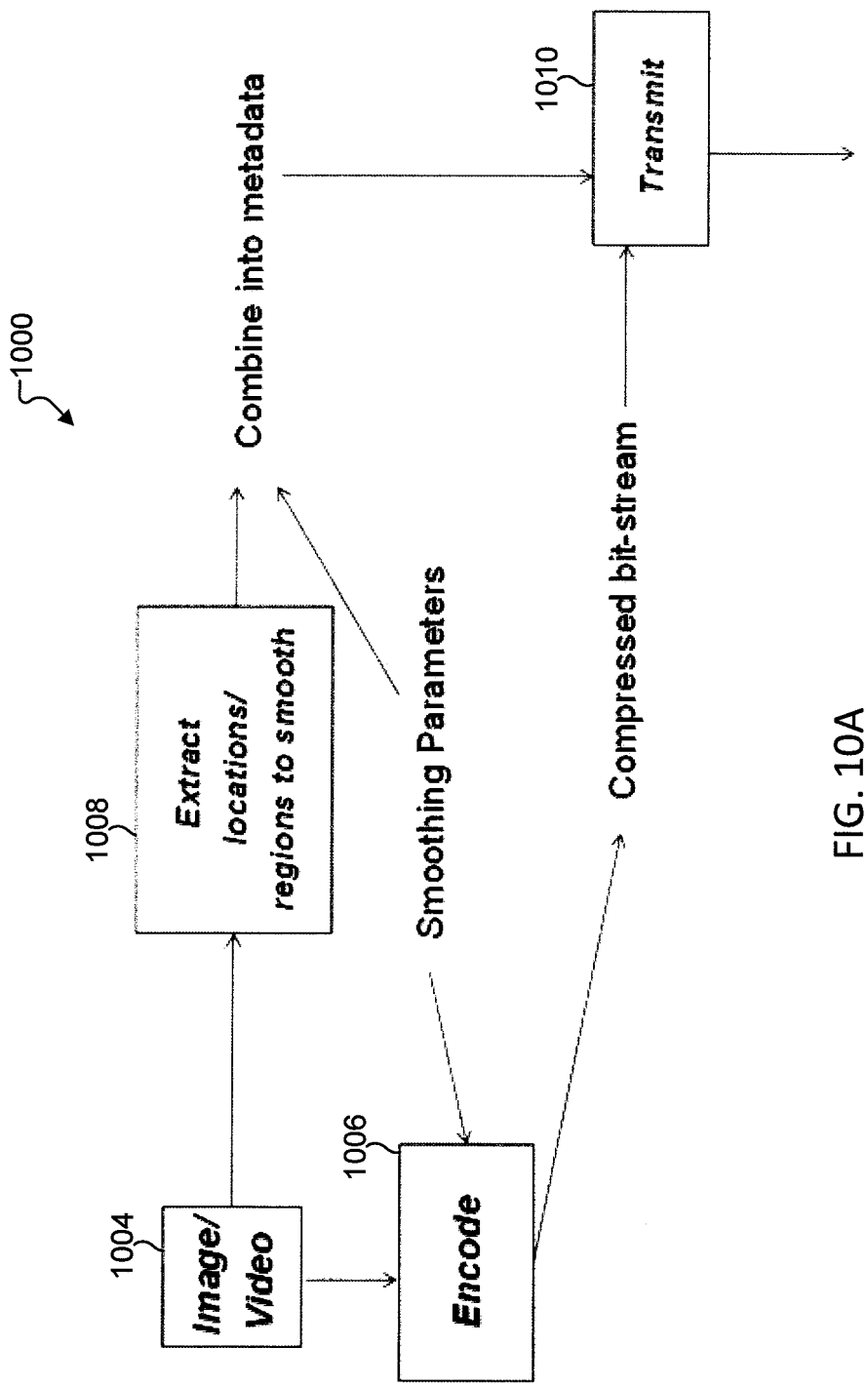
FIGS. 10A and 10B illustrate processes and for smoothing and inverse filter application at an encoder and decoder according to this disclosure.
Figure 10B:
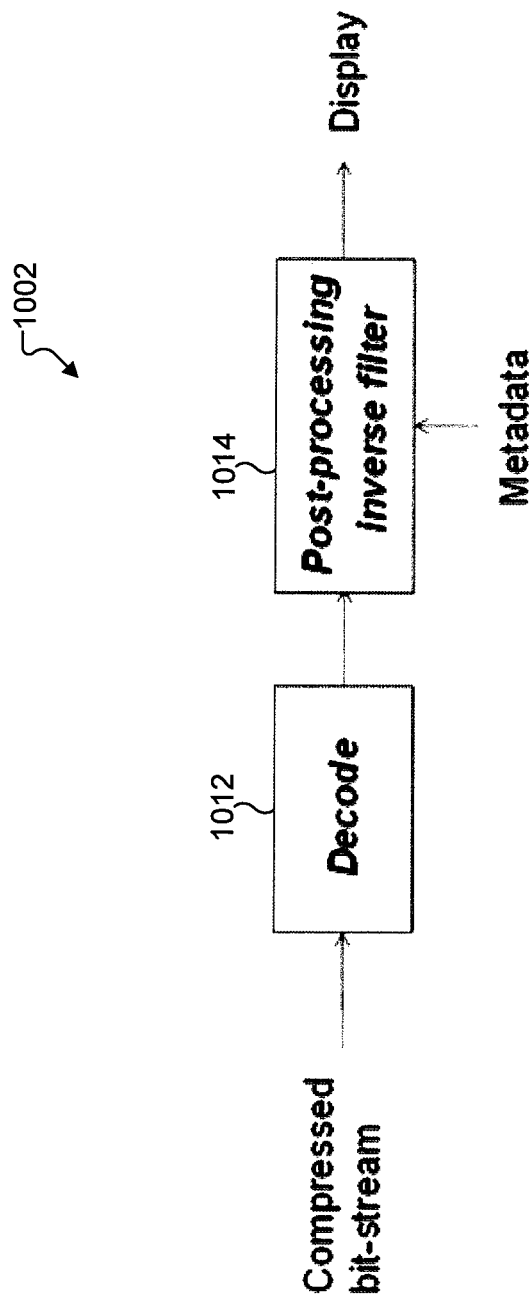

FIGS. 10A and 10B illustrate processes 1000 and 1002 for smoothing and inverse filter application at an encoder and decoder according to this disclosure. The embodiments shown in FIGS. 10A and 10B are for illustration only. Other embodiments could be used without departing from the scope of the present disclosure. A processor, such as processor 140 as shown in FIG. 1, can perform different steps of processes 1000 and 1002.

One or more embodiments of this disclosure provide smoothing parameters for inverse filters at a decoder. In a 360° video, pixels from the top and bottom camera occupy a large region. Such a phenomenon also occurs in a map of earth, where regions near the poles seem to be enlarged. In this example, smoothing can be performed at the encoder to smooth the regions in the top and bottom. Specifically, the metadata can include (i) the regions to smooth; (b) filter parameters for smoothing, such as filter type, strength, window size etc. Such metadata parameter can be generated at the encoder, and sent to the decoder. At the decoder, with the help of this metadata, an "inverse" filter can be applied to enhance the picture quality for these regions.

At block 1004, an image or video can be provided. At block 1006, an encoder can encode the image or video. At block 1008, the encoder can extract locations of the image or regions to smooth. Smoothing parameters can be applied during encoding and combined with the regions to smooth to form the metadata. At block 1010, the metadata and compressed bit stream can be transmitted to a decoder.

At block 1012 the decoder can decode the compressed bit stream. At block 1014, the decoder can perform post-processing using an inverse filter and metadata and control a display to display the image or video.

In an example embodiment, the metadata can include content (HDR/SDR) based smoothing. Depending on the content type: HDR or SDR, different smoothing techniques can be used. In addition, luminance based color smoothing technique (metadata) can be derived as well. For example, the human eye is not that sensitive in dark regions for colors, while it is sensitive in well-lit regions. So, more smoothing can be performed in dark regions, while no or less smoothing can be performed in well-lit regions. Such a smoothing scheme and corresponding metadata would be used if the objective is to reduce the amount to data transmission.

The metadata can include the number of different regions in picture and whether the regions are regular (rectangle) or irregular (non-rectangle). For each region, the metadata can specify starting and end positions of pixels, whether each region is HDR or SDR, and whether a tone mapping or inverse tone mapping function to be used. If region are regular, the metadata can include pixel locations of top-left, bottom-left, top-right, and bottom-right pixels. If a region is irregular, the metadata can include a first pixel location (x,y) of a boundary, and a flag endRegion to indicate the end pixel for the region. This will be followed by a second pixel and flag endRegion; followed by the number of pixels required to define the boundary. For the final pixel, the endRegion flag would be 1. As an example, for a triangle, for the third pixel on the boundary, the endRegion would be 1. The metadata could, for each region, specify filter parameters for smoothing, such as filter type, strength, window size etc.

In an example embodiment, the metadata can include a map of which camera goes where on display. The metadata could also include stitching parameters for different camera views and warping parameters for the video. The cameras in a 360° view can be mapped to the multiple displays in an immersive setting. Stitching parameters for which scenes from the cameras are to be stitched per region can also be sent via metadata to the decoder. Also, there can be warping of the camera views at the encoder during stitching. These parameters can also be transmitted as metadata.

In one or more embodiments of this disclosure, transmission of metadata can be supported in any way as the standard supports. For example, in video codecs such as H.264/AVC and HEVC, metadata can be supported in supplemental enchantment information (SEI) or network abstraction layer units (NALU), and can be sent there. In other standards for Society of Motion Picture and Television Engineers (SMPTE), the metadata can be supported via different entities.

One or more embodiments of this disclosure show how to carry a particular metadata inside a NAL unit, SEI in H.264/AVC, or other parameter suitable for information encapsulation. This embodiment can use camera-view based APL metadata encapsulation as an example. A similar method is applicable for all the other metadata mentioned above.

Figure 11:
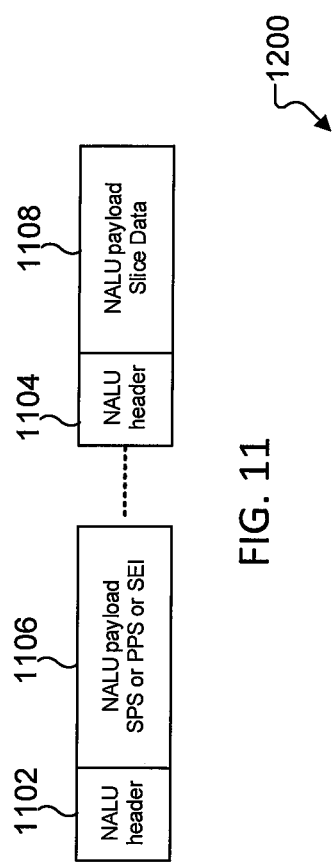
FIG. 11 illustrates an example NALU headers and payloads according to an embodiment of this disclosure.

FIG. 11 illustrates an example NALU headers 1102*a-b* and payloads 1104*a-b* according to an embodiment of this disclosure. One or more embodiments of this disclosure provide encapsulation of metadata using NALU. NALU is used herein as defined in H.264/AVC. An HEVC associated NALU extension would be similar. In FIG. 11, an NALU consists of two parts, including NALU header 1102-1104, and payload 1106-1108. NALU header 1102-1104 is parsed at the decoder for appropriate decoding operations. For example, if the NALU header 1102 indicates current NALU payload 1106 is a SPS (sequence parameter set), then SPS parsing and initialization will be activated; alternatively, if the NALU header 1104 indicates current NALU payload 1108 is a slice NALU, then the slice decoding is performed.

In H.264/AVC and its extensions, NALU is byte-aligned. An NALU header is 1-byte or 4-bytes depending on whether the NALU is a regular single layer packet or scalable packet.

TABLE 3

NALU syntax in H.264/AVC

| | C | Descriptor |
|---|---|---|
| nal_unit( NumBytesInNALunit ) { | | |
|     forbidden_zero_bit | All | f(1) |
|     nal_ref_idc | All | u(2) |
|     nal_unit_type | All | u(5) |
|     NumBytesInRBSP = 0 | | |
|     nalUnitHeaderBytes = 1 | | |
|     if( nal_unit_type = = 14 \|\| nal_unit_type = = 20 \|\| | | |
|         nal_unit_type = = 21 ) { | | |
|         if( nal_unit_type != = 21 ) | | |
|             svc_extension_flag | All | u(1) |
|         else | | |
|             avc_3d_extension_flag | All | u(1) |
|         if( svc_extension_flag ) { | | |
|             nal_unit_header_svc_extension( ) /* specified in Annex G */ | All | |
|             nalUnitHeaderBytes += 3 | | |
|         } else if( avc_3d_extension_flag ) { | | |
|             nal_unit_header_3davc_extension( ) /* specified in Annex J */ | | |
|             nalUnitHeaderBytes += 2 | | |
|         } else { | | |
|             nal_unit_header_mvc_extension( ) /* specified in Annex H */ | All | |
|             nalUnitHeaderBytes += 3 | | |
|         } | | |
|     } | | |
|     for( i = nalUnitHeaderBytes; i < NumBytesInNALunit; i++ ) { | | |
|         if( i + 2 < NumBytesInNALunit && next_bits( 24 ) = = 0x000003 ) { | | |
|             rbsp_byte[ NumBytesInRBSP++ ] | All | b(8) |
|             rbsp_byte[ NumBytesInRBSP++ ] | All | b(8) |
|             i += 2 | | |
|             emulation_prevention_three_byte /* equal to 0x03 */ | All | f(8) |
|         } else | | |
|             rbsp_byte[ NumBytesInRBSP++ ] | All | b(8) |
|     } | | |
| } | | |

Figure 12:
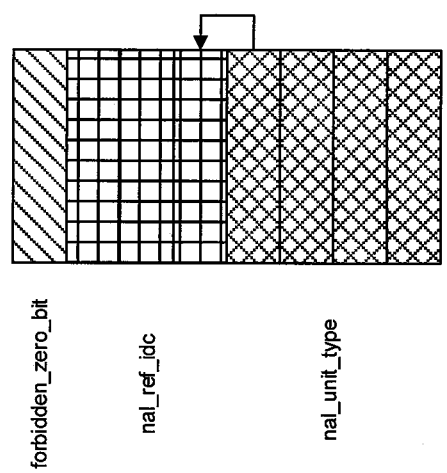
FIG. 12 illustrates an example NAL unit header syntax for H.264/AVC according to an embodiment of this disclosure.

FIG. 12 illustrates an example NAL unit header syntax 1200 for H.264/AVC according to an embodiment of this disclosure. In FIG. 12, a normal 1-byte NALU header includes the 1 bit forbidden_zero_bit (always zero), 3 bits nal_ref_idc indicating whether this NALU can be referred, and 5 bits nal_unit_type showing the exact type of following NAL unit payload. If nal_unit_type equals to 14 or 20, an extra 3 bytes are parsed to derive the necessary information for H.264 scalable video. An embodiment of this disclosure introduces a new nal_unit_type=X indicating the camera-based APL metadata information. In one example embodiment, X can be 24. Once nal_unit_type=24, camera based APL( ) is used to parse and initialize the decoding camera-based APL related metadata. For each time the decoder parses this NALU header, the decoder enables the picture level APL data for each of the HDR cameras.

TABLE 4

Nal_unit_type definitions in H.264/AVC

| nal_unit_type | Content of NAL unit and RBSP syntax structure | C | Annex A NAL unit type class | Annex G and Annex H NAL unit type class | Annex I and Annex J NAL unit type class |
|---|---|---|---|---|---|
| 0 | Unspecified | | non-VCL | non-VCL | non-VCL |
| 1 | Coded slice of a non-IDR picture slice_layer_without_partitioning_rbsp( ) | 2, 3, 4 | VCL | VCL | VCL |
| 2 | Coded slice data partition A slice_data_partition_a_layer_rbsp( ) | 2 | VCL | not applicable | not applicable |
| 3 | Coded slice data partition B slice_data_partition_b_layer_rbsp( ) | 3 | VCL | not applicable | not applicable |
| 4 | Coded slice data partition C slice_data_partition_c_layer_rbsp( ) | 4 | VCL | not applicable | not applicable |
| 5 | Coded slice of an IDR picture slice_layer_without_partitioning_rbsp( ) | 2, 3 | VCL | VCL | VCL |
| 6 | Supplemental enhancement information (SEI) sei_rbsp( ) | 5 | non-VCL | non-VCL | non-VCL |
| 7 | Sequence parameter set seq_parameter_set_rbsp( ) | 0 | non-VCL | non-VCL | non-VCL |
| 8 | Picture parameter set pic_parameter_set_rbsp( ) | 1 | non-VCL | non-VCL | non-VCL |
| 9 | Access unit delimiter access_unit_delimiter_rbsp( ) | 6 | non-VCL | non-VCL | non-VCL |

TABLE 4-continued

Nal_unit_type definitions in H.264/AVC

| nal_unit_type | Content of NAL unit and RBSP syntax structure | C | Annex A NAL unit type class | Annex G and Annex H NAL unit type class | Annex I and Annex J NAL unit type class |
|---|---|---|---|---|---|
| 10 | End of sequence end_of_seq_rbsp( ) | 7 | non-VCL | non-VCL | non-VCL |
| 11 | End of stream end_of_stream_rbsp( ) | 8 | non-VCL | non-VCL | non-VCL |
| 12 | Filler data filler_data_rbsp( ) | 9 | non-VCL | non-VCL | non-VCL |
| 13 | Sequence parameter set extension seq_parameter_set_extension_rbsp( ) | 10 | non-VCL | non-VCL | non-VCL |
| 14 | Prefix NAL unit prefix_nal_unit_rbsp( ) | 2 | non-VCL | suffix dependent | suffix dependent |
| 15 | Subset sequence parameter set subset_seq_parameter_set_rbsp( ) | 0 | non-VCL | non-VCL | non-VCL |
| 16 | Depth parameter set depth_parameter_set_rbsp( ) | 11 | non-VCL | non-VCL | non-VCL |
| 17 . . . 18 | Reserved | | non-VCL | non-VCL | non-VCL |
| 19 | Coded slice of an auxiliary coded picture without partitioning slice_layer_without_partitioning_rbsp( ) | 2, 3, 4 | non-VCL | non-VCL | non-VCL |
| 20 | Coded slice extension slice_layer_extension_rbsp( ) | 2, 3, 4 | non-VCL | VCL | VCL |
| 21 | Coded slice extension for a depth view component or a 3D-AVC texture view component slice_layer_extension_rbsp( ) | 2, 3, 4 | non-VCL | non-VCL | VCL |
| 22 . . . 23 | Reserved | | non-VCL | non-VCL | VCL |
| 24 . . . 31 | Unspecified | | non-VCL | non-VCL | non-VCL |

Table 5: Extended NAL unit syntax.

TABLE 6

Extended NAL unit type definition

| | C | Descriptor |
|---|---|---|
| nal_unit( NumBytesInNALunit ) { | | |
|   forbidden_zero_bit | All | f(1) |
|   nal_ref_idc | All | u(2) |
|   nal_unit_type | All | u(5) |
|   NumBytesInRBSP = 0 | | |
|   nalUnitHeaderBytes = 1 | | |
|   if( nal_unit_type = = 14 \|\| nal_unit_type = = 20 \|\| | | |
|     nal_unit_type = = 21 ) { | | |
|     if( nal_unit_type != 21 ) | | |
|       svc_extension_flag | All | u(1) |
|     else | | |
|       avc_3d_extension_flag | All | u(1) |
|     if( svc_extension_flag ) { | | |
|       nal_unit_header_svc_extension( ) /* specified in Annex G */ | All | |
|       nalUnitHeaderBytes += 3 | | |
|     } else if( avc_3d_extension_flag ) { | | |
|       nal_unit_header_3davc_extension( ) /* specified in Annex J */ | | |
|       nalUnitHeaderBytes += 2 | | |
|     } else { | | |
|       nal_unit_header_mvc_extension( ) /* specified in Annex H */ | All | |
|       nalUnitHeaderBytes += 3 | | |
|     } | | |
|   } | | |
| if (nal_unit_type == 24 ){ /* specified in Annex New */ | | |
| camera_based_APL_flag | All | u(1) |
| if (camera_based_APL_flag) | | |
|   camera_based_APL( ) | | |
|   } | | |
|   for( i = nalUnitHeaderBytes; i < NumBytesInNALunit; i++ ) { | | |
|     if( i + 2 < NumBytesInNALunit && next_bits( 24 ) = = 0x000003 ) { | | |
|       rbsp_byte[ NumBytesInRBSP++ ] | All | b(8) |
|       rbsp_byte[ NumBytesInRBSP++ ] | All | b(8) |
|       i += 2 | | |
|       emulation_prevention_three_byte /* equal to 0x03 */ | All | f(8) |

TABLE 6-continued

Extended NAL unit type definition

```
    } else
        rbsp_byte[ NumBytesInRBSP++ ]                All    b(8)
    }
}
```

| nal_unit_type | Content of NAL unit and RBSP syntax structure | C | Annex A NAL unit type class | Annex G and Annex H NAL unit type class | Annex I and Annex J NAL unit type class |
|---|---|---|---|---|---|
| 0 | Unspecified | | non-VCL | non-VCL | non-VCL |
| 1 | Coded slice of a non-IDR picture slice_layer_without_partitioning_rbsp( ) | 2, 3, 4 | VCL | VCL | VCL |
| 2 | Coded slice data partition A slice_data_partition_a_layer_rbsp( ) | 2 | VCL | not applicable | not applicable |
| 3 | Coded slice data partition B slice_data_partition_b_layer_rbsp( ) | 3 | VCL | not applicable | not applicable |
| 4 | Coded slice data partition C slice_data_partition_c_layer_rbsp( ) | 4 | VCL | not applicable | not applicable |
| 5 | Coded slice of an IDR picture slice_layer_without_partitioning_rbsp( ) | 2, 3 | VCL | VCL | VCL |
| 6 | Supplemental enhancement information (SEI) sei_rbsp( ) | 5 | non-VCL | non-VCL | non-VCL |
| 7 | Sequence parameter set seq_parameter_set_rbsp( ) | 0 | non-VCL | non-VCL | non-VCL |
| 8 | Picture parameter set pic_parameter_set_rbsp( ) | 1 | non-VCL | non-VCL | non-VCL |
| 9 | Access unit delimiter access_unit_delimiter_rbsp( ) | 6 | non-VCL | non-VCL | non-VCL |
| 10 | End of sequence end_of_seq_rbsp( ) | 7 | non-VCL | non-VCL | non-VCL |
| 11 | End of stream end_of_stream_rbsp( ) | 8 | non-VCL | non-VCL | non-VCL |
| 12 | Filler data filler_data_rbsp( ) | 9 | non-VCL | non-VCL | non-VCL |
| 13 | Sequence parameter set extension seq_parameter_set_extension_rbsp( ) | 10 | non-VCL | non-VCL | non-VCL |
| 14 | Prefix NAL unit prefix_nal_unit_rbsp( ) | 2 | non-VCL | suffix dependent | suffix dependent |
| 15 | Subset sequence parameter set subset_seq_parameter_set_rbsp( ) | 0 | non-VCL | non-VCL | non-VCL |
| 16 | Depth parameter set depth_parameter_set_rbsp( ) | 11 | non-VCL | non-VCL | non-VCL |
| 17 . . . 18 | Reserved | | non-VCL | non-VCL | non-VCL |
| 19 | Coded slice of an auxiliary coded picture without partitioning slice_layer_without_partitioning_rbsp( ) | 2, 3, 4 | non-VCL | non-VCL | non-VCL |
| 20 | Coded slice extension slice_layer_extension_rbsp( ) | 2, 3, 4 | non-VCL | VCL | VCL |
| 21 | Coded slice extension for a depth view component or a 3D-AVC texture view component slice_layer_extension_rbsp( ) | 2, 3, 4 | non-VCL | non-VCL | VCL |
| 22 . . . 23 | Reserved | | non-VCL | non-VCL | VCL |
| 24 | Camera-based APL metadata camera_based_APL ( ) | | VCL | VCL | |
| 25 . . . 31 | Unspecified | | non-VCL | non-VCL | non-VCL |

Figure 13:
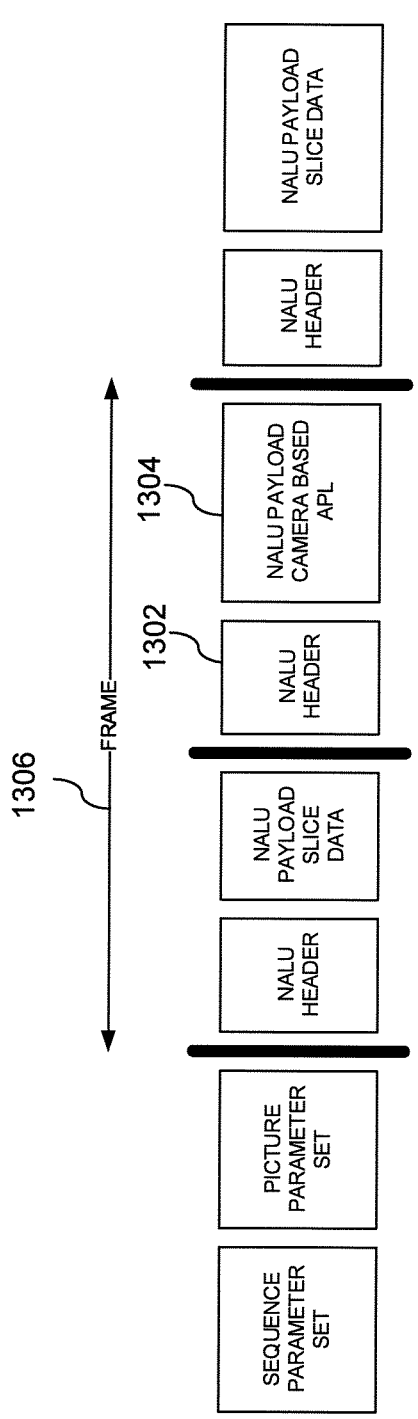
FIG. 13 illustrates an example frame based extended NALU header insertion for a picture-level camera based APL encapsulation according to an embodiment of this disclosure.

FIG. 13 illustrates an example frame based extended NALU header insertion for a picture-level camera based APL encapsulation according to an embodiment of this disclosure. In FIG. 13, an NALU header 1302 and NALU payload 1304 are shown inserted within a frame 1306. In one example embodiment, NALU header 1302 can be one of NALU headers 1102-1104 and NALU payload 1304 can be one of payloads 1106-1108 as shown in FIG. 11.

Figure 14:
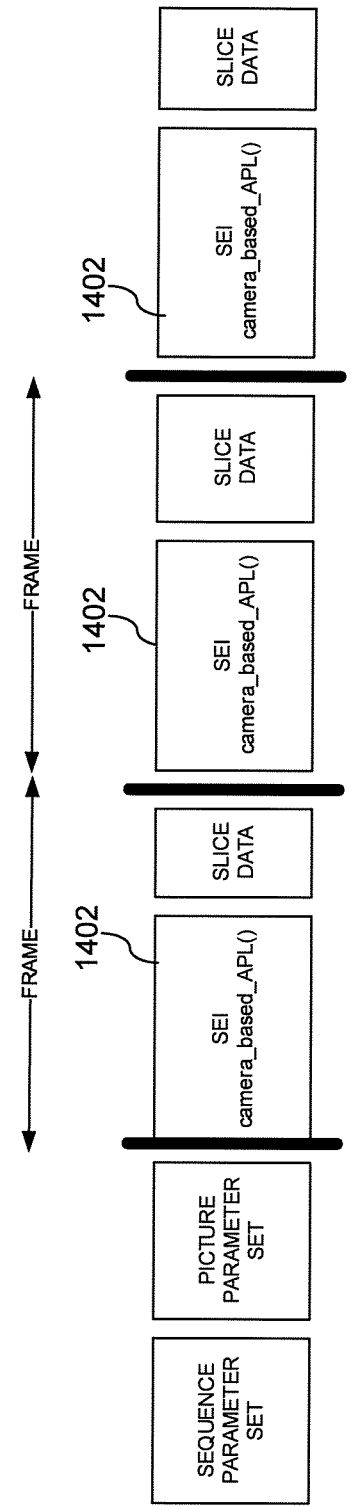
FIG. 14 illustrates an example frame based extended SEI header insertion for a picture-level camera and GOP level based APL encapsulation according to an embodiment of this disclosure.

FIG. 14 illustrates an example frame based extended SEI header insertion for a picture-level camera and GOP level based APL encapsulation according to an embodiment of this disclosure. One or more embodiments of this disclosure provide encapsulation using SEI. That SEI syntax can be parsed at the decoder to help with obtaining the APL based parameters for performing tone mapping at the decoder. These SEI messages can be derived during pre-processing/encoding.

In one example, the camera based APL metadata 1402 (i.e., camera_based_APL( )) can be inserted into the bit stream frame (picture) by frame as a new SEI message with payloadType=X, as shown in Table 5. The payloadType can be a variety of values, including, for example, 55. Any other un-used number can also be used to define such SEI message. Each time the decoder parses this SEI message, the decoder enables the frame-level camera-based APL parsing as defined in Table 5. The decoder/post-processor can perform various functions based on the camera-based_APL metadata.

TABLE 7

SEI message defined in H.264/AVC Annex D.

| | C | Descriptor |
|---|---|---|
| sei_payload( payloadType, payloadSize ) { | | |
| if( payloadType = = 0 ) | | |
|     buffering_period( payloadSize ) | 5 | |
| else if( payloadType = = 1 ) | | |
|     pic_timing( payloadSize ) | 5 | |
| else if( payloadType = = 2 ) | | |
|     pan_scan_rect( payloadSize ) | 5 | |
| else if( payloadType = = 3 ) | | |
|     filler_payload( payloadSize ) | 5 | |
| else if( payloadType = = 4 ) | | |
|     user_data_registered_itu_t_t35( payloadSize ) | 5 | |
| else if( payloadType = = 5 ) | | |
|     user_data_unregistered( payloadSize ) | 5 | |
| else if( payloadType = = 6 ) | | |
|     recovery_point( payloadSize ) | 5 | |
| else if( payloadType = = 7 ) | | |
|     dec_ref_pic_marking_repetition( payloadSize ) | 5 | |
| else if( payloadType = = 8 ) | | |
|     spare_pic( payloadSize ) | 5 | |
| else if( payloadType = = 9 ) | | |
|     scene_info( payloadSize ) | 5 | |
| else if( payloadType = = 10 ) | | |
|     sub_seq_info( payloadSize ) | 5 | |
| else if( payloadType = = 11 ) | | |
|     sub_seq_layer_characteristics( payloadSize ) | 5 | |
| else if( payloadType = = 12 ) | | |
|     sub_seq_characteristics( payloadSize ) | 5 | |
| else if( payloadType = = 13 ) | | |
|     full_frame_freeze( payloadSize ) | 5 | |
| else if( payloadType = = 14 ) | | |
|     full_frame_freeze_release( payloadSize ) | 5 | |
| else if( payloadType = = 15 ) | | |
|     full_frame_snapshot( payloadSize ) | 5 | |
| else if( payloadType = = 16 ) | | |
|     progressive_refinement_segment_start( payloadSize ) | 5 | |
| else if( payloadType = = 17 ) | | |
|     progressive_refinement_segment_end( payloadSize ) | 5 | |
| else if( payloadType = = 18 ) | | |
|     motion_constrained_slice_group_set( payloadSize ) | 5 | |
| else if( payloadType = = 19) | | |
|     film_grain_characteristics( payloadSize ) | 5 | |
| else if( payloadType = = 20 ) | | |
|     deblocking_filter_display_preference( payloadSize ) | 5 | |
| else if( payloadType = = 21 ) | | |
|     stereo_video_info( payloadSize ) | 5 | |
| else if( payloadType = = 22 ) | | |
|     post_filter_hint( payloadSize ) | 5 | |
| else if( payloadType = = 23 ) | | |
|     tone_mapping_info( payloadSize ) | 5 | |
| else if( payloadType = = 24 ) | | |
|     scalability_info( payloadSize ) /* specified in Annex G */ | 5 | |
| else if( payloadType = = 25 ) | | |
|     sub_pic_scalable_layer( payloadSize ) /* specified in Annex G */ | 5 | |
| else if( payloadType = = 26 ) | | |
|     non_required_layer_rep( payloadSize ) /* specified in Annex G */ | 5 | |
| else if( payloadType = = 27 ) | | |
|     priority_layer_info( payloadSize ) /* specified in Annex G */ | 5 | |
| else if( payloadType = = 28 ) | | |
|     layers_not_present( payloadSize ) /* specified in Annex G */ | 5 | |
| else if( payloadType = = 29 ) | | |
|     layer_dependency_change( payloadSize ) /* specified in Annex G */ | 5 | |
| else if( payloadType = = 30 ) | | |
|     scalable_nesting( payloadSize ) /* specified in Annex G */ | 5 | |
| else if( payloadType = = 31 ) | | |
|     base_layer_temporal_hrd( payloadSize ) /* specified in Annex G */ | 5 | |
| else if( payloadType = = 32 ) | | |
|     quality_layer_integrity_check( payloadSize ) /* specified in Annex G */ | 5 | |
| else if( payloadType = = 33 ) | | |
|     redundant_pic_property( payloadSize ) /* specified in Annex G */ | 5 | |
| else if( payloadType = = 34 ) | | |
|     tl0_dep_rep_index( payloadSize ) /* specified in Annex G */ | 5 | |
| else if( payloadType = = 35 ) | | |
|     tl_switching_point( payloadSize ) /* specified in Annex G */ | 5 | |
| else if( payloadType = = 36 ) | | |
|     parallel_decoding_info( payloadSize ) /* specified in Annex H */ | 5 | |
| else if( payloadType = = 37 ) | | |

TABLE 7-continued

SEI message defined in H.264/AVC Annex D.

|  | C | Descriptor |
|---|---|---|
|     mvc_scalable_nesting( payloadSize ) /* specified in Annex H */<br>else if( payloadType = = 38 ) | 5 |  |
|     view_scalability_info( payloadSize ) /* specified in Annex H */<br>else if( payloadType = = 39 ) | 5 |  |
|     multiview_scene_info( payloadSize ) /* specified in Annex H */<br>else if( payloadType = = 40 ) | 5 |  |
|     multiview_acquisition_info( payloadSize ) /* specified in Annex H */<br>else if( payloadType = = 41 ) | 5 |  |
|     non_required_view_component( payloadSize ) /* specified in Annex H */<br>else if( payloadType = = 42 ) | 5 |  |
|     view_dependency_change( payloadSize ) /* specified in Annex H */<br>else if( payloadType = = 43 ) | 5 |  |
|     operation_points_not_present( payloadSize ) /* specified in Annex H */<br>else if( payloadType = = 44 ) | 5 |  |
|     base_view_temporal_hrd( payloadSize ) /* specified in Annex H */<br>else if( payloadType = = 45 ) | 5 |  |
|     frame_packing_arrangement( payloadSize )<br>else if( payloadType = = 46 ) | 5 |  |
|     multiview_view_position( payloadSize ) /* specified in Annex H */<br>else if( payloadType = = 47 ) | 5 |  |
|     display_orientation( payloadSize )<br>else if( payloadType = = 48 ) | 5 |  |
|     mvcd_scalable_nesting( payloadSize ) /* specified in Annex I */<br>else if( payloadType = = 49 ) | 5 |  |
|     mvcd_view_scalability_info( payloadSize ) /* specified in Annex I */<br>else if( payloadType = = 50 ) | 5 |  |
|     depth_representation_info( payloadSize ) /* specified in Annex I */<br>else if( payloadType = = 51 ) | 5 |  |
|     three_dimensional_reference_displays_info( payloadSize )<br>                                    /* specified in Annex I */<br>else if( payloadType = = 52 ) | 5 |  |
|     depth_timing( payloadSize ) /* specified in Annex I */<br>else if( payloadType = = 53 ) | 5 |  |
|     depth_sampling_info( payloadSize ) /* specified in Annex I */<br>else if( payloadType = = 54 ) | 5 |  |
|     constrained_depth_parameter_set_identifier( payloadSize )<br>                                      /* specified in Annex J */<br>        else if( payloadType = = 55 ) /* specified in Annex New */<br>camera_based_APL( payloadSize)<br>else | 5 |  |
|     reserved_sei_message( payloadSize )<br>if( !byte_aligned( ) ) { | 5 |  |
| bit_equal_to_one /* equal to 1 */<br>while( !byte_aligned( ) ) | 5 | f(1) |
| bit_equal_to_zero /* equal to 0 */<br>}<br>} | 5 | f(1) |

The configuration in various figures for using metadata for VR plus HDR applications can be standardized to provide a standard for virtual reality. Such a standard enables inter-operability between different vendor offerings. Compression of metadata using Huffman or Arithmetic coding can also be performed. This will further increase compression efficiency None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A user equipment (UE), the UE comprising:
    a receiver configured to receive a three-hundred sixty degree video including a plurality of frames, the three-hundred sixty degree video including metadata that indicates a plurality of regions of interest in a key frame of the plurality of frames, and a frame of the plurality of frames including at least one high dynamic range (HDR) image and at least one standard dynamic range (SDR) image;
    a display configured to display a portion of a frame, of the plurality of frames, corresponding to a position of a current viewpoint of the UE within the three-hundred sixty degree video; and
    a processor configured to:
        control the display to display a pointer that indicates a region of interest among the plurality of regions of interest, wherein the pointer is displayed within the current viewpoint within the three-hundred sixty degree video; and
        perform an action to re-position the current viewpoint of the UE from the portion of the frame to the region of interest in the key frame indicated by the metadata of the three-hundred sixty degree video.

2. The UE of claim 1, wherein the processor configured to perform the action to re-position the UE on the region of interest at a set number of frames prior to displaying of the key frame.

3. The UE of claim 1, wherein the processor is further configured to:
   identify the current viewpoint of the UE within the frame of the plurality of frames; and
   move the current viewpoint of the UE towards the region of interest based on the region of interest not being displayed within the current viewpoint within the three-hundred sixty degree video.

4. The UE of claim 1, wherein the pointer is displayed at a time prior to displaying the key frame;
   wherein the metadata is extracted on the key frame prior to displaying the key frame; and
   wherein the metadata of at least one of the plurality of regions of interest in the key frame includes advertisement data.

5. The UE of claim 1, wherein the action includes a trajectory of a user viewpoint through at least two of the plurality of frames.

6. The UE of claim 5, wherein the processor is further configured to:
   move the current viewpoint of the UE along the trajectory.

7. The UE of claim 1, wherein each frame of the plurality of frames includes a plurality of images stitched together to form a stitched image.

8. The UE of claim 7, wherein the stitched image for the at least one frame of the plurality of frames includes the at least one HDR image and the at least one SDR image.

9. The UE of claim 8, wherein the processor is further configured to:
   determine whether the display supports HDR; and
   control the display, based on the determination, to display the at least one HDR image when the display supports HDR and display the at least one SDR image when the display does not support HDR.

10. The UE of claim 9, wherein the processor is further configured to:
    perform tone mapping on the at least one SDR image when the display supports HDR; and
    perform inverse tone mapping on the at least one HDR image when the display supports SDR.

11. A method for processing a three-hundred sixty degree video, the method comprising:
    receiving the three-hundred sixty degree video including a plurality of frames, the three-hundred sixty degree video including metadata that indicates a plurality of regions of interest in a key frame of the plurality of frames, and a frame of the plurality of frames including at least one high dynamic range (HDR) image and at least one standard dynamic range (SDR) image;
    displaying a portion of a frame of the plurality of frames corresponding to a position of a current viewpoint of a user equipment (UE) within the three-hundred sixty degree video;
    displaying a pointer that indicates a region of interest among the plurality of regions of interest, wherein the pointer is displayed within the current viewpoint within the three-hundred sixty degree video; and
    performing an action to re-position the current viewpoint of the UE from the portion of the frame to the region of interest in the key frame indicated by the metadata of the three-hundred sixty degree video.

12. The method of claim 11, wherein performing the action to re-position the UE to the region of interest comprises performing the action to re-position the UE on the region of interest by a set number of frames prior to displaying of the key frame.

13. The method of claim 11, wherein performing the action to re-position the UE to the region of interest comprises:
    identifying the current viewpoint of the UE within the frame of the plurality of frames; and
    moving the current viewpoint of the UE towards the region of interest based on the region of interest not being displayed within the current viewpoint within the three-hundred sixty degree video.

14. The method of claim 11, wherein the pointer is displayed at a time prior to displaying the key frame wherein the metadata is extracted on the key frame prior to displaying the key frame; and
    wherein the metadata of at least one of the plurality of regions of interest in the key frame includes advertisement data.

15. The method of claim 11, wherein the region of interest includes a trajectory of a user viewpoint through at least two of the plurality of frames.

16. The method of claim 15, wherein performing the action to re-position the UE on the region of interest comprises:
    move the current viewpoint of the UE along the trajectory.

17. The method of claim 11, wherein each frame of the plurality of frames includes a plurality of images stitched together to form a stitched image.

18. The method of claim 17, wherein the stitched image for the at least one frame of the plurality of frames includes the at least one HDR image and the at least one SDR image.

19. The method of claim 18, further comprising:
    determining whether a display supports HDR; and
    in response to the determination, controlling the display to display the at least one HDR image when the display supports HDR and display the at least one SDR image when the display does not support HDR.

20. The method of claim 19, further comprising:
    performing tone mapping on the at least one SDR image when the display supports HDR; and
    performing inverse tone mapping on the at least one HDR image when the display supports SDR.

* * * * *